United States Patent
Morelli et al.

(10) Patent No.: US 6,236,674 B1
(45) Date of Patent: *May 22, 2001

(54) TRANSCEIVER CONTROL WITH SLEEP MODE OPERATION

(75) Inventors: Daniel J. Morelli, Norton; Michael L. Trompower, Navarre, both of OH (US)

(73) Assignee: Teletransactions, Inc., Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/619,797

(22) Filed: Mar. 20, 1996

Related U.S. Application Data

(63) Continuation-in-part of application No. 08/605,914, filed on Feb. 23, 1996, now Pat. No. 5,838,720.

(51) Int. Cl.[7] .............................. H04B 1/38; H04B 1/16; H04B 7/00; H04L 5/16
(52) U.S. Cl. .................... 375/219; 375/220; 375/222; 455/38.3; 455/73; 455/31.1; 455/343; 455/574
(58) Field of Search .................................. 375/220, 219, 375/222; 455/343, 574, 73, 31.1, 38.3

(56) References Cited

U.S. PATENT DOCUMENTS

| | | | |
|---|---|---|---|
| 4,194,153 | * 3/1980 | Masaki et al. | 340/825.44 |
| 4,384,361 | * 5/1983 | Masaki | 455/31 |
| 4,577,315 | 3/1986 | Otsuka . | |
| 4,903,319 | * 2/1990 | Kasai et al. | 455/33 |
| 4,955,038 | 9/1990 | Lee et al. . | |
| 5,027,428 | * 6/1991 | Ishiguro et al. | 455/67 |
| 5,029,183 | 7/1991 | Tymes . | |
| 5,103,461 | 4/1992 | Tymes . | |
| 5,142,550 | 8/1992 | Tymes . | |

(List continued on next page.)

Primary Examiner—Stephen Chin
Assistant Examiner—Michael W. Maddox
(74) Attorney, Agent, or Firm—Renner, Otto, Boisselle & Sklar, L.L.P.

(57) ABSTRACT

A transceiver which keeps circuitry associated with a receiver in a powered down state during periods when a Received Signal Strength Indicator (RSSI) indicates that a signal being received is below a pre-determined threshold level, and which begins to power up the transmitter as soon as it is determined that a packet being received requires a response. The RSSI signal represents the strength of any signal current being received, and if the RSSI signal falls below a given threshold level, digital circuitry associated with the back-end circuitry of the receiver system is disabled. If the RSSI signal rises above the threshold level, the digital circuitry of the receiver is enabled. A control circuit within the transceiver processes the packet as it is received to determine whether the packet requires a response. If it is determined that a response is necessary, the control circuit provides a control signal to the transmitter to power up the transmitter from a sleep mode even before the entire packet has been received and processed. The control circuit then continues to process the remainder of the packet as it is received while the transmitter powers up from the sleep mode. In this manner, the transmitter will become stabilized much earlier. Accordingly, the transceiver is able to respond more quickly than conventional devices and is thus able to increase response times and overall data exchange rates. Moreover, battery power of the transceiver is utilized more efficiently compared to devices which must continuously maintain the receiver and transmitter in fully powered modes.

43 Claims, 11 Drawing Sheets

U.S. PATENT DOCUMENTS

| | | | |
|---|---|---|---|
| 5,144,296 | * | 9/1992 | DeLuca et al. ................. 340/825.44 |
| 5,157,687 | | 10/1992 | Tymes . |
| 5,179,724 | * | 1/1993 | Lindoff ................................. 455/76 |
| 5,220,564 | | 6/1993 | Tuch et al. . |
| 5,265,270 | * | 11/1993 | Stengel et al. ....................... 455/343 |
| 5,276,680 | | 1/1994 | Messenger . |
| 5,280,498 | | 1/1994 | Tymes et al. . |
| 5,392,023 | * | 2/1995 | D'Avello et al. .................... 358/400 |
| 5,440,298 | * | 8/1995 | Kuramatsu .......................... 455/38.3 |
| 5,471,655 | * | 11/1995 | Kivari ................................... 455/127 |
| 5,479,441 | | 12/1995 | Tymes et al. . |
| 5,519,506 | | 5/1996 | D'Avello et al. . |
| 5,524,021 | | 6/1996 | Scotton et al. . |
| 5,541,976 | * | 7/1996 | Ghisler .................................. 379/57 |
| 5,559,804 | * | 9/1996 | Amada et al. ...................... 370/95.3 |
| 5,566,366 | * | 10/1996 | Russo et al. ......................... 455/343 |
| 5,606,728 | * | 2/1997 | Keba et al. .......................... 455/38.3 |
| 5,734,686 | * | 3/1998 | Kuramatsu ..................... 340/825.44 |

\* cited by examiner

TRANSCEIVER CONTROL WITH SLEEP MODE OPERATION

CROSS REFERENCE TO RELATED APPLICATION

This application is a continuation-in-part of U.S. patent application Ser. No. 08/605,914, filed on Feb. 23, 1996 now U.S. Pat. No. 5,838,720.

TECHNICAL FIELD

The present invention relates generally to wireless communication devices, and more particularly to transceivers having a receiver and/or transmitter which switches between a high power consumption mode and a low power consumption (or "sleep") mode.

BACKGROUND OF THE INVENTION

In recent years, the use of wireless communication systems having mobile transceivers which communicate with a hardwired network, such as a local area network (LAN) or a wide area network (WAN), has become widespread. The mobile transceivers, commonly referred to as mobile terminals, may take one of several different forms. For instance, in retail stores hand-held scanning units may be used to allow for scanning inventory bar codes. In a warehouse, portable units mounted to a vehicle may be used to gather information from the warehouse floor. In a medical environment, the mobile terminal may take the form of a pen based workslate which allows medical personnel to work with full page screens at once.

In a typical wireless communication system, each mobile terminal communicates with a networked system via a radio or optical link in order to allow for a real time exchange of information. The mobile terminals communicate through one of several base stations interconnected to the network. The base stations allow for a wireless data communication path to be formed.

Each mobile terminal and base station communicate via their respective transmitter and receiver (i.e., transceiver) systems. Typically, the transmitter and receiver in each device share the same antenna and a control signal is used to switch the antenna between a transmitting and receiving mode. Thus, only one of the transmitter or receiver needs to be active at any given time.

Information exchanged between mobile terminals and base stations is generally sent in packet format. Packets of information (also referred to herein simply as "packets" or "data packets") are a defined set of data bits which carry information such as source address, destination address, synchronization bits, data, error correcting codes, etc.

In order to provide for an efficient operating system, access to a channel is expeditiously controlled by a media access protocol. For example, a typical media access protocol may provide that if a device receives a packet which requires a response, transmission of the response must be initiated within a time period on the order of 15 microseconds after receiving the entire original packet. This time span, or slot time, is referred to as the short inter-frame space (SIFS). The purpose of the SIFS is twofold. First, it speeds up data exchange between devices by limiting the amount of time a device can take to respond. Secondly, it limits the amount of time a device receiving the response must remain in the receiving mode. As mentioned above, since the transmitter and receiver oftentimes are connected to the same antenna, a device may miss information if it is transmitting information at the same time it could be receiving information.

During such time when a device is receiving information but not transmitting information, a fully powered transmitter can nevertheless consume a considerable amount of power. In order to conserve power in the above mentioned mobile terminals, for example, the transmitter and perhaps other non-essential circuitry is generally placed into a sleep-like state, referred to herein as a "sleep mode", during periods where the system is receiving information. During the sleep mode, the power provided to the transmitter and other non-essential circuitry is reduced to minimum levels. Since most mobile terminals operate on battery power, the sleep mode helps maintain a longer usable battery life without the need for recharging or replacing the battery.

An unfortunate consequence of placing the transmitter of a device into a sleep mode is that the data exchange rate will be reduced. The reduction in data exchange rate is attributable to the time required for the transmitter to stabilize into a fully powered or active state after a signal is sent to the transmitter indicating that it needs to transmit information. For instance, it is common for transmitter circuitry to take approximately two-thirds of the allowed SIFS time to stabilize. During such time, information is neither being transmitted or received by the responding device. As a consequence, overall data exchange rate suffers. Furthermore, given the strict SIFS time limitations typically in place, it is difficult for the transmitter to respond to a packet during the short period of SIFS time remaining after the transmitter has reached a fully powered state (i.e., stabilized). Systems attempting to meet the aforementioned strict SIFS time limitations typically have higher probabilities of errors occurring in each transmission. In addition, as higher spectral density modulation techniques are implemented (typically to increase data rate), more complex transmitter circuitry is utilized which requires even longer stabilization time. Thus, even greater possibilities of transmission errors or slower data exchange rates exist.

It is also known in the art to conserve power within a device by reducing the power provided to the receiver when a device is transmitting information. According to one conventional approach, a transceiver in a mobile terminal powers up its receiver only at predetermined times or intervals during which the device may receive information. For the remainder of the time, the receiver circuitry remains in a powered down state, i.e., a sleep mode. For example, according to one conventional protocol, during the times the receiver of the mobile terminal is powered up, the mobile terminal listens for "beacons" sent from base stations indicating there is information which needs to be transmitted to the mobile terminal. If information within a beacon indicates that a base station has information stored therein to be transmitted to the mobile terminal, the mobile terminal in turn transmits a "poll" packet requesting that the information be sent. By using this protocol, the mobile terminal can keep its receiver in a sleep mode at all times except when it is active to listen for a beacon and for a short time after the mobile terminal sends a poll packet and is therefore poised to receive information buffered in the base station. Thus, power may be conserved.

Unfortunately, however, regardless of when a base station is prepared to communicate with the mobile terminal, the base station must buffer all information until such time when the mobile terminal indicates to the base station that its receiver is activated from the sleep mode to receive information. The undesirable result of this power saving protocol is that, in exchange for the power conservation obtained via this mode, a substantial reduction in the data exchange rate results. More specifically, since the mobile terminal receiver cannot receive information at all times there is a delay in the exchange of data.

Other conventional approaches for conserving power by placing the receiver into a sleeping mode suffer from similar drawbacks. For example, according to another technique the mobile terminal and base station are configured in a master-slave relationship. The mobile terminal is designated master and powers up its receiver from a sleep mode only during such times as the mobile terminal expects/desires to receive information. Again, however, the mobile terminal cannot receive information at all times. As a result, the data exchange rate is much lower than in the case where the mobile terminal is able to receive information at virtually any time.

In view of the aforementioned shortcomings in existing transceivers due to the combination of the necessity to conserve power, the time limitations for responding to an information packet, and the desire for higher data rates, there is a strong need in the art for a transceiver which overcomes such drawbacks. More specifically, there is a strong need in the art for a transceiver in which the switching of the transmitter between an active mode and a sleep mode allows for sufficient time to respond to packets within a prescribed response period, even at high data rates in which the system may be operating. Furthermore, there is a strong need for a transceiver having a receiver which can receive data packets at any time while still utilizing a low power consumption mode of operation. More generally, there is a strong need in the art for a transceiver and system which can maintain an optimal data exchange rate while continuing to conserve power by operating in a power savings mode of operation.

SUMMARY OF THE INVENTION

The present invention relates to a transceiver in which the transmitter and/or receiver is switched between an active mode and a sleep mode in order to conserve power without substantially sacrificing data exchange rates. According to the preferred embodiment, the present invention utilizes an existing receive-signal-strength-indicator (RSSI) signal and/or one or more properties of an incoming signal to control power provided to portions of the circuitry in the receiver to switch the receiver between an active mode and a sleep mode. As an example, the RSSI signal represents the signal strength of any signal which is received by the front end of the transceiver. If the strength of the RSSI signal falls below a given threshold level, power provided to nonessential portions of the circuitry within the receiver is reduced to place the receiver in a sleep mode. While in a sleep mode, the receiver continues to monitor the RSSI signal. If the RSSI signal goes above the threshold level, thus indicating an incoming signal, power is again applied to portions of circuitry within the receiver to switch the receiver back to an active mode. Since the portion of the receiver circuitry which is powered down during the sleep mode is digital circuitry which may be stabilized almost instantaneously, the receiver quickly switches from the sleep mode to the active mode. Consequently, receipt and processing of the received signal may be initiated essentially immediately.

Such control of the power applied to the receiver circuitry based on the RSSI signal or other properties of the incoming signal provides two distinct benefits. First, conservation of power is achieved by requiring that the receiver circuitry be fully powered only when a signal of sufficient strength and/or intelligibility is received. Secondly, system performance is optimized with respect to data exchange rates as a result of the mobile terminal receiver always being able to change quickly from a sleep mode to an active mode to receive information. Consequently, no delays in the exchange of information exist as compared to mobile terminals operating in a conventional power savings mode.

Additionally, the present invention relates specifically to a transceiver which begins to power up the transmitter as soon as it is determined that a packet being received requires a response. A control circuit within the transceiver processes the packet as it is received to determine whether the packet requires a response. If it is determined that a response is necessary, the control circuit provides a control signal to the transmitter to power up the transmitter from a sleep mode even before the entire packet has been received. The control circuit then continues to process the remainder of the packet as it is received while the transmitter powers up from the sleep mode. In this manner, the transmitter will become stabilized much earlier. Accordingly, the transceiver is able to respond more quickly than conventional devices and is thus able to increase response times and overall data exchange rates. Moreover, battery power of the transceiver is utilized more efficiently as compared to devices which must continuously maintain the transmitter in a fully powered mode.

According to one aspect of the invention, a transceiver apparatus is provided, including: a transmitter portion for transmitting information; a receiver portion for receiving information, the receiver portion being switchable between a low power consumption mode and an active mode; and a control circuit coupled to the receiver portion for selectively switching the receiver portion from the low power consumption mode to the active mode upon detecting an information signal to be received by the receiver, whereby the receiver portion receives the information signal in the active mode.

According to another aspect of the invention, a transceiver apparatus is provided, including: a transmitter portion for transmitting information; and a receiver portion for receiving information, wherein the receiver portion includes circuitry for detecting a signal strength of a received signal, and circuitry for disabling receiver circuitry included in the receiver portion if the signal strength of the received signal is below a pre-determined threshold.

In accordance with yet another aspect of the invention, a method for controlling a transceiver apparatus having a transmitter portion for transmitting information; and a receiver portion for receiving information, the receiver portion being switchable between a low power consumption mode and an active mode is provided, the method including the step of: selectively switching the receiver portion from the low power consumption mode to the active mode upon detecting an information signal to be received by the receiver, whereby the receiver portion receives the information signal in the active mode.

According to a further aspect of the invention, a method for controlling a transceiver apparatus having transmitter portion for transmitting information; and a receiver portion for receiving information, the receiver portion being switchable between a low power consumption mode and an active mode is provided, the method including the step of: selectively switching the receiver portion from the active mode to the low power consumption mode if a signal strength of a received signal falls below a predetermined threshold.

In yet another aspect of the invention, a transceiver apparatus is provided, including: a transmitter portion for transmitting information, the transmitter portion being switchable, based on a control input, between a low power consumption mode and an active mode during which information is transmitted; a receiver portion for receiving information, the receiver portion being switchable between a low power consumption mode and an active mode; and a control circuit coupled to the receiver portion for selectively switching the receiver portion from the low power consumption mode to the active mode by detecting an information signal to be received by the receiver, whereby the receiver portion receives the information signal in the active mode.

In accordance with still another aspect of the invention, a receiver apparatus is provided, including: a receiver portion for receiving information, wherein the receiver portion includes circuitry for detecting a signal strength of a received signal, and circuitry for disabling receiver circuitry included in the receiver portion if the signal strength of the received signal is below a predetermined threshold.

According to yet another aspect of the invention, a cellular communication system is provided, including: a network; a host computer coupled to the network; a plurality of base stations coupled to the network and communicating with the host computer, each of the base stations including a base station transmitter for transmitting wireless communications and a base station receiver for receiving wireless communications; and a plurality of mobile terminals each for communicating with the network by way of at least one of the plurality of base stations, each of the plurality of mobile terminals having a mobile terminal receiver for receiving wireless communications from at least one of the plurality of base stations; wherein the receiver of at least one of the mobile terminals or base stations includes: a receiver portion for receiving information, the receiver portion being switchable between a low power consumption mode and an active mode; and a control circuit coupled to the receiver portion for selectively switching the receiver portion from the low power consumption mode to the active mode by detecting an information signal to be received by the receiver, whereby the receiver portion receives the information signal in the active mode.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
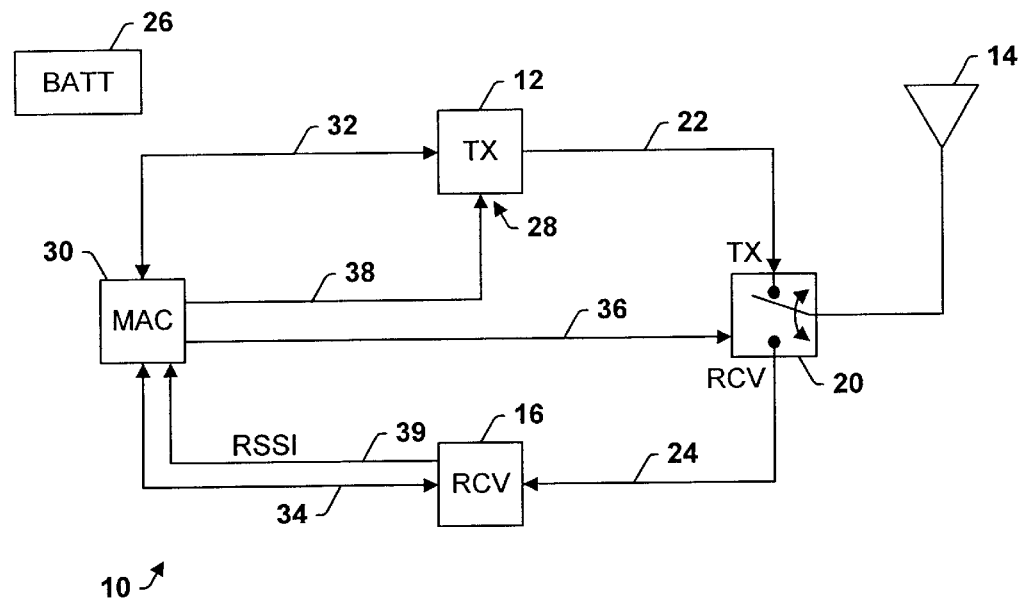
FIG. 1 is a block diagram of a transceiver having a transmitter and receiver which individually are switchable between a low power consumption mode (i.e., a "sleep mode") and an active mode in accordance with the present invention.

The present invention will now be described with reference to the drawings in which like reference numerals are used to refer to like elements throughout.

Referring initially to FIG. 1, a transceiver in accordance with the present invention is generally designated 10. The transceiver 10 includes a radio transmitter 12 for transmitting radio signals via an antenna 14. In addition, the transceiver 10 includes a radio receiver 16 for receiving radio signals via the antenna 14. An antenna switch 20 allows the transceiver 10 to transmit or receive signals depending on the position of the switch. When the switch 20 is in the transmit (TX) position, the antenna 14 is coupled to the output of the transmitter 12 via line 22 so that the transmitter 12 can transmit information. Alternatively, when the switch 20 is in the receive (RCV) position the antenna 14 is coupled to the input of the receiver 16 by way of line 24. The receiver 16 thereby receives information via the antenna 14.

In the exemplary embodiments described herein, the transmitter 12 and receiver 16 are generally of conventional design with the exception of any specific modifications described herein. In general, the transmitter 12 and receiver 16 are designed to transmit and receive, respectively, digital information modulated onto a radio frequency (rf) carrier. As is described more fully below in connection with FIG. 2, the digital information is transmitted and received in the form of packets. The transmitter 12 is of the type which can be selectively switched between a low power consumption mode (i.e., a sleep mode) and an active mode as discussed above. More specifically, when the transmitter 12 is in the sleep mode, the supply of power to the power amplifier (not shown), modulation circuitry (not shown), and/or various other power consuming components within the transmitter 12 is cut off or otherwise reduced. In this manner, the load on a battery 26 used to power the transceiver 10 is reduced. The transmitter 12 is selectively switched between the sleep mode and active mode based on a control signal provided to a sleep/active input 28. The operation of the transceiver 10 in relation to switching the transmitter 12 between a sleep mode and an active mode is described in more detail below in relation to FIG. 6A thru FIG. 9.

The receiver 16 is also of a type which can be switched between a sleep mode and an active mode. While the receiver 16 is in a sleep mode, the power supplied to non-essential circuitry within the receiver 16 (i.e., circuitry not necessary for operation during the sleep mode) is cut off or otherwise reduced. Hence, the load on the battery 26 to power the transceiver 10 again is reduced. However, unlike the above-discussed conventional systems in which a receiver in a power savings mode can only receive information at predetermined times, the receiver 16 of the present invention can receive information at any time. Specifically, the receiver 16 is capable of switching from a sleep mode to an active mode substantially instantaneously as a signal is received. As a result, the receiver 16 is able to remain in a sleep mode until such time as an incoming signal is detected. Details regarding the operation of the transceiver 10 in relation to switching the receiver 16 between a sleep mode and active mode are provided below with reference to FIGS. 3–5.

Continuing to refer to FIG. 1, the transceiver 10 further includes a control circuit 30 which processes the information which is communicated via the transceiver 10. In the preferred embodiment, the control circuit 30 is made up of a medium access controller (MAC) which is connected to the transmitter 12 and receiver 16 by way of lines 32 and 34, respectively. The MAC 30 provides a RCV/TX control signal on line 36 to the antenna switch 20 in order to selectively switch the antenna switch 20 between the transmit and receive positions. Additional control signals are provided by the MAC 30 in order to control the active/sleep states of the transmitter 12 and receiver 16. More particularly, the MAC 30 provides a sleep/active control signal on line 38 to the input 28 in order to selectively switch the transmitter 12 between the sleep and active modes as is discussed more fully below. In addition, the MAC 30 receives a receive signal strength indicator (RSSI) signal on line 39. Based on the RSSI signal, the MAC 30 provides control information to the receiver 16 via line 34. Such control information is processed by the receiver 16 in order to control whether the receiver 16 is in an active mode or a sleep mode.

The MAC 30 preferably includes a series of state machines (not shown) which process incoming data packets received by the receiver 16. As part of the processing, the MAC 30 strips off individual fields of the incoming packet as described below in order to forward selective information to the receiver 16 and to determine which packets require a response. In the event a packet requires a response, the MAC 30 provides a control signal on line 38 to switch the transmitter 12 from a sleep mode to an active mode. In addition, the MAC 30 provides a control signal on line 36 to switch the antenna switch 20 from the receive position to the transmit position. Thereafter, the transmitter 12 can transmit an appropriate response. When the transmitter 12 is not being used, the MAC 30 provides a control signal on line 38 to switch the transmitter 12 back to the sleep mode in order to allow the transceiver 10 to conserve battery power. In addition, the MAC 30 switches the antenna switch 20 back to the receive position. Furthermore, while in receive mode, the MAC 30 provides signals to control circuitry within the receiver 16 which allows the receiver 16 to be placed in a sleep mode during times when no information is being transmitted to the transceiver 10 for its receipt.

The MAC 30 differs from conventional medium access controllers in several ways. For instance, the MAC 30 does not wait until the entire packet has been received by the receiver 16 before providing a control signal on line 38 to switch the transmitter 12 from a sleep mode to an active mode. Rather, as a packet of information is received by the transceiver 10 via the receiver 16, the MAC 30 processes the packet in order to determine if a response is necessary. The MAC 30 receives the packet from the receiver 16 via line 34 as the packet is received. As is explained more fully below, the MAC 30 evaluates the contents of a type/address field (FIG. 2) included in the packet, such field containing information regarding the type of packet which has been received. More specifically, the MAC 30 evaluates the field for the presence of some type of indicia as to whether the packet is of the type that requires a response or is of the type which does not require a response. In the event the MAC 30 determines that an incoming packet does require a response, the MAC 30 can immediately provide the sleep/active control signal on line 38 so as to initiate the powering up of the transmitter 12 from the sleep mode to the active mode.

Thus, during such time as the receiver 16 continues to receive the remainder of the packet which is then processed by the MAC 30 in a conventional manner, the transmitter 12 can be transitioning from the sleep mode to a stable active mode. The transmitter 12 can therefore be in a stable state either by the time the entire packet has been received and processed or shortly thereafter. In this manner, all or the majority of the SIFS slot time is available for responding to the packet as will be more fully appreciated based on the description presented below. Consequently, a high transceiver data exchange rate may be maintained with minimal concern for transmitter circuitry stabilization time. Thus, even when utilizing complex transmitter circuitry requiring a long stabilization time, as is typically needed to support high data rates, an optimal data exchange rate can still be achieved.

Additionally, the MAC 30 includes a microprocessor (not shown in FIG. 1) which maintains a dynamically changing RSSI threshold signal representing the current noise floor. The threshold is utilized by receiver control circuitry to compare with the RSSI signal and to determine when to switch the receiver 16 from a sleep mode to an active mode. As described more fully below, the RSSI signal is provided to the MAC 30 from the front end of the receiver 16 which remains active even during a sleep mode. When the RSSI signal exceeds a threshold signal calculated by the MAC 30, it is determined that an incoming signal is available to be received by the receiver 16. Hence, the portion of the receiver 16 which is powered down during the sleep mode is then awoken in order that the information may be received. The portion of the receiver 16 which is powered down during the sleep mode is primarily digital circuitry which can be fully activated and stabilized relatively instantaneously compared to the timing of the incoming signal. This allows the incoming signal or packet to be received fully without any significant loss of information. After the incoming signal is received, the receiver 16 is again placed in a sleep mode until another signal is received.

Thus, additional power savings is obtained by virtue of the receiver 16 being able to remain in a sleep mode until such time as an incoming signal is received. At the same time, a high data exchange rate is maintained since the receiver 16 is not limited to receiving information only at predetermined times as in conventional systems.

Figure 2:
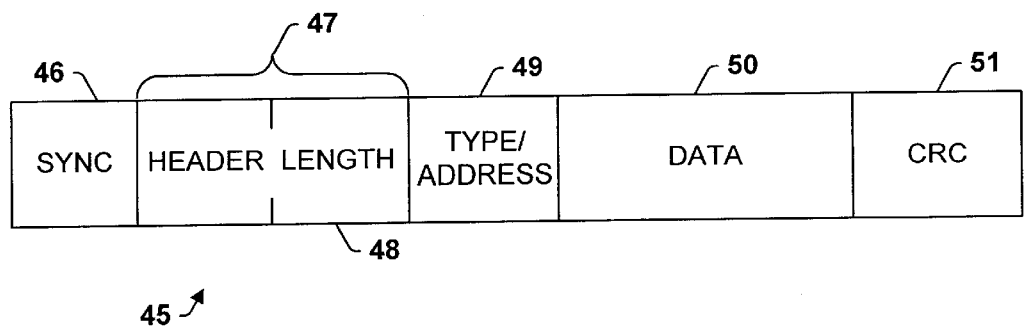
FIG. 2 is a schematic representation of a packet format in accordance with the present invention.

FIG. 2 shows the format of an exemplary data packet 45 received by the transceiver 10 of FIG. 1. As is conventional, the data packet 45 is represented by a sequence of data and/or control information which is segmented into respective fields. The data packet 45 together with the information contained therein is constructed by the device which subsequently transmits the packet 45 to the transceiver 10. The format of the data packet 45 will typically be governed by the system protocol as is conventional. The data packet 45 includes, in order, a synchronization field 46 including synchronizing bits for synchronizing the receiver 16; a header field 47 including header information such as the source address of the data packet, the header field 47 including at the end thereof a length field 48 including information regarding the length of the packet (e.g., number of bits); a type/address field 49; a data field 50; and a cyclic redundancy check (CRC) field 51. It is noted that the length of the respective fields as shown in FIG. 2 as well as the other figures herein is not necessarily shown in proper corresponding proportion. In many cases the length of some fields has been exaggerated in the drawings for ease of understanding. Furthermore, it is also noted that the synchronization field 46 may be transmitted at a data rate different from that of the remaining packet, as is well known throughout the art.

The type/address field 49 includes the destination address of the packet 45 and information indicating whether or not the packet is of a type which requires a response. For example, the type/address field 49 can include one or more bits which are set to indicate that the transceiver 10 is required to transmit a positive and/or negative acknowledgment of receipt of the packet 45. In addition, or in the alternative, the type/address field 49 can include information which identifies the packet as a type which needs to be processed and transmitted by the transceiver 10 in order to forward the information to another location. Regardless of the particular reason why the packet 45 may necessitate a response, the type/address field 49 has one or more predetermined indicia therein for indicating whether the packet 45 is of a type which requires that the transceiver 10 respond by transmitting information or is of a type which does not require that the transceiver 10 respond by transmitting information. The type/address field 49 is shown located approximately in the middle of the data packet 45, although it will be appreciated that the type/address field 49 could be located elsewhere in the packet. In the preferred embodiment, however, the type/address field 49 is located within the initial half of the data packet 45 and most preferably towards the front of the packet 45.

Following the type/address field 49, the data packet 45 includes a data field 50 which contains the primary data being sent within the packet. The data field 50 is then followed by a cyclic redundancy check (CRC) field 51 which includes a CRC code for error detection as is conventional.

Figure 3:
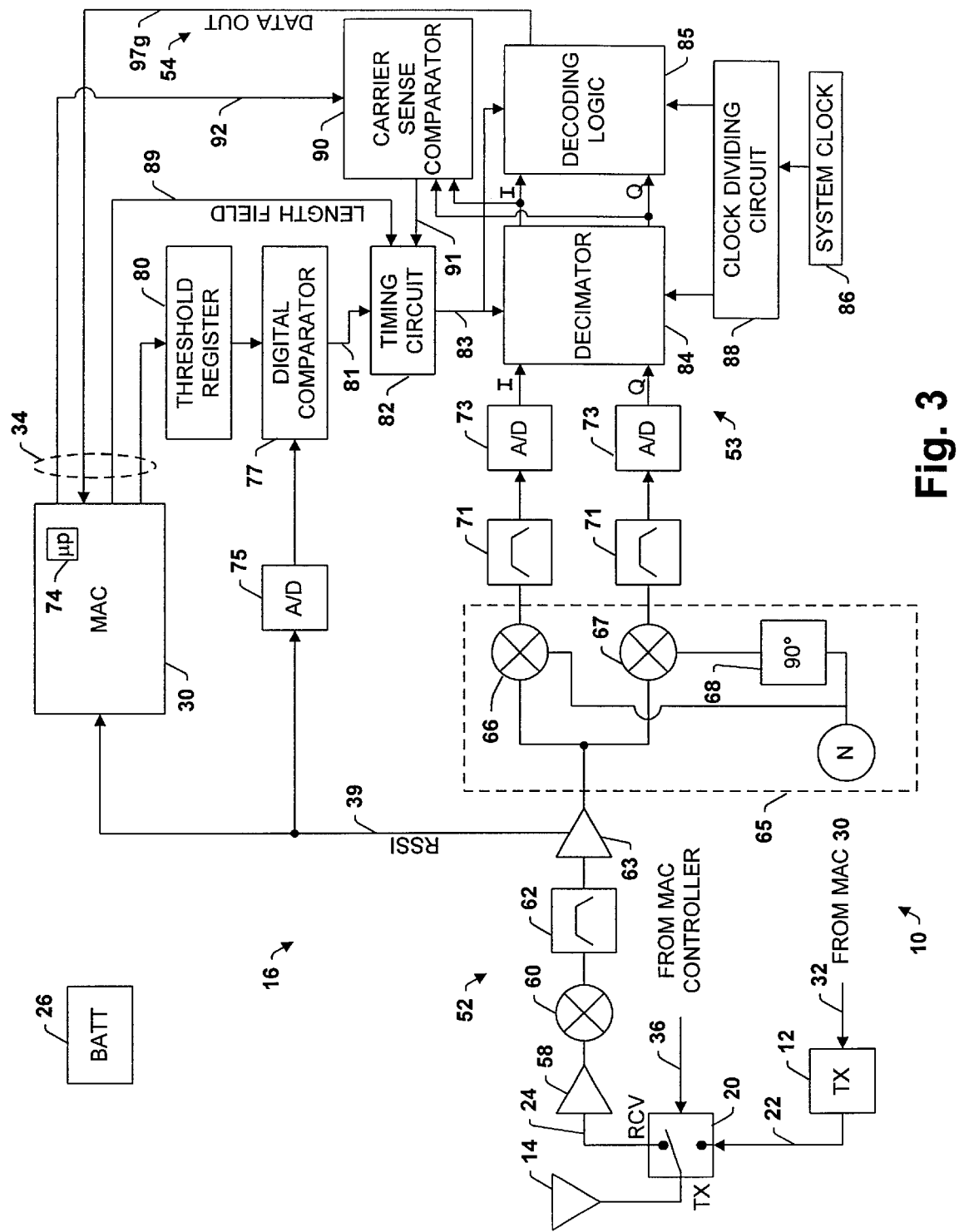
FIG. 3 is a block diagram of the transceiver of FIG. 1 showing in detail the receiver in accordance with the present invention.

Referring now to FIG. 3, the receiver 16 is shown in detail within the transceiver 10. The receiver 16 includes a front end 52 which is primarily an analog circuit for down converting and demodulating signals received by the antenna 14, and a primarily digital back end 53 for digitizing, filtering and decoding received signals. In addition, the receiver 16 includes an active/sleep mode control circuit 54 which selectively switches the receiver 16 between the sleep mode and active mode based on information provided by the MAC 30. More particularly, the control circuit 54 is designed to disable/power down the filtering and decoding circuitry in the back end 53 during the sleep mode as described in more detail below.

As noted above, the antenna 14 is connected to the antenna switch 20 which controls whether the antenna 14 functions to transmit or receive data at any instant in time. The antenna switch 20 can be any type switch for switching the antenna 14 between a transmitting mode and a receiving mode—for example, a PIN-diode based single pole-double throw (SPDT) type switch as is known. The control line 36 couples the antenna switch 20 to the MAC controller 30 which in turn controls the mode in which the antenna 14 performs.

The antenna switch 20 is normally in the receive position except when the transceiver 10 is transmitting information. When the antenna switch 20 is in the receive position, signals received by the antenna 14 are input to a low noise amplifier (LNA) 58 included at the input to the receiver 16. The LNA 58 amplifies incoming signals which later will be demodulated to extract data. The amplified signal from the LNA 58 is provided to a mixer 60 which mixes the incoming signal down to an intermediate frequency which can be readily processed by the receiver 16 as is well known in the art. Typically, in a mobile terminal the mixer 60 mixes the incoming signal down to an intermediate frequency in the range of 200 to 500 MHZ, for example. The output of the mixer 60 is input to a surface acoustic wave (SAW) filter 62 which filters the incoming signal and reduces noise as is conventional.

The filtered signal from the SAW filter 62 is input to a low noise amplifier (LNA) 63. The LNA 63 further amplifies the incoming signal for subsequent processing. In addition, the LNA 63 provides as an output a received signal strength indicator (RSSI) signal on line 39. The RSSI signal is provided using conventional techniques which are well known in the art. As is known, the RSSI signal is an analog signal which is indicative of the power level of the received signal. The RSSI signal on line 39 is input to the MAC 30 for further processing such that, as discussed below in connection with FIG. 4, the MAC 30 computes an RSSI threshold level. The RSSI signal on line 39 is also input to an A/D converter 75 which converts the analog RSSI signal into a multi-bit digital representation. The digitized RSSI signal serves as one of the inputs to a digital comparator 77. The other input to the digital comparator 77 is provided by the output of a threshold register 80. The threshold register 80 functions to hold the RSSI threshold value which is provided to the threshold register 80 from the MAC 30. The digital comparator 77 compares the current RSSI signal as obtained from line 39 with the threshold value provided from the threshold register 80. In the event the RSSI signal exceeds the threshold value, such event being indicative that an incoming signal is being received, the digital comparator 77 provides a control output on line 81 indicating the same. In the alternative, if the RSSI signal is less than the threshold value in the threshold register 80, this generally indicates that any received signals are at the noise level and are not intended to be received by the receiver 16. Hence, the digital comparator 77 provides a control output on line 81 indicating that the RSSI signal is less than the threshold value and that no incoming signal or packet is being received.

The control output on line 81 is provided to a timing control circuit 82 which is responsible for providing appropriate timing signals to the digital circuitry in the receiver back end 53 in order to ensure that the digital receiver circuitry is enabled and disabled at the proper times. The timing control circuit 82 is preferably made up of one or more state machines which are configured to provide a control signal on line 83 which is switchable between an active mode level and a sleep mode level. The control signal on line 83 is input to a decimator 84 and a digital decoding logic circuit 85. The decimator 84 and the decoding logic 85 are conventional in that they are used to filter the incoming signal and to decode the data, respectively. As is known, the decimator 84 includes correlator circuitry (not shown) which filters the I and Q components of the incoming signal. The decoding logic 85 extrapolates the data received in the incoming signal. The decimator 84 and the decoding logic 85 each receive respective clock signals originating from a system clock 86 which is divided down to the appropriate frequency by a clock dividing circuit 88.

When the control signal provided on line 83 is at an active mode level, the decimator 84 and decoding logic 85 are configured such that all of the respective circuitry therein receives full operating voltages (e.g., $V_{cc}$, etc.) and is thus fully enabled for operation. Alternatively, when the control signal on line 83 is at a sleep mode level, the decimator 84 and the decoding logic 85 is designed such that all or part of the operating voltages provided to the respective circuitry therein is reduced or completely cut off so as to disable the circuits. Thus, the power draw of the receiver 16 due to the decimator 84 and the decoding logic 85 is substantially reduced during the sleep mode. At the same time, however, the system clock 86 and clock dividing circuit 88 continue to operate even in the sleep mode. Consequently, when the receiver 16 is switched from a sleep mode to an active mode there is no substantial delay in the digital circuitry waiting for the system clock or related circuitry to stabilize. Since the system clock and clock signals provided to the decimator 84 and decoding logic 85 are operating at a substantially higher rate than the bit rate of the incoming signal, the decimator 84 and decoding logic 85 will stabilize within a few system clock cycles. Accordingly, the receiver 16 is stabilized substantially instantaneously upon the control signal on line 83 being switched to the active mode level from the sleep mode level. The timing control circuit 82 is configured to continue to evaluate the level of the RSSI signal alone or in combination with one or more other criteria of the received signal to avoid switching the receiver 16 back to the sleep mode prior to all information being received properly and processed as discussed below in relation to FIG. 5. Generally speaking, the MAC 30 provides to the timing control circuit 82 via line 89 information relating to a length of each packet received. In addition, a carrier sense comparator 90 included in the receiver 16 provides information on line 91 to the timing control circuit 82 relating to the intelligibility of the incoming signal. Such information is processed by the timing control circuit 82 in case an information signal is received intact while not necessarily having a RSSI signal strength which remains above the RSSI threshold.

Regarding the ordinary operation of the receiver 16 when receiving an incoming signal, the output of the LNA 63 is input to a conventional quadrature demodulator circuit 65 which includes a first mixer 66 and a second mixer 67 having a 90 degree phase shifter 68 associated therewith which is used to produce I and Q components of the incoming signal using conventional techniques. The I and Q components are filtered by respective SAW filters 71 and are input to respective A/D converters 73.

The digitized I and Q components from the A/D converters 73 are coupled to the decimator 84 which is used to correlate the incoming I and Q signals and to extrapolate the transmitted data as is conventional. Digital correlation techniques such as that described in U.S. patent application Ser. No. 08/335,328, filed on Nov. 7, 1994 now abandoned, could be used. Once correlated, the I and Q signals are fed to the digital decoding logic circuit 85 which is coupled to the decimator 84. The decoding logic circuit 85 includes circuitry for data decoding, PN code acquisition, PN code tracking and carrier tracking, for example, as are all conventional. The decimator 84 and decoding logic circuit 85 may hereinafter also be referred to as the digital receiver circuitry.

Using conventional techniques, the carrier sense comparator 90 computes a carrier sense signal based on the square root of $(I^2+Q^2)$. The carrier sense signal is indicative of whether there is sufficient correlation among the received information for the signal to be interpreted. The carrier sense comparator 90 compares the value of the carrier sense signal as computed therein against a predetermined threshold criteria based upon which it can be concluded that the information in the received signal is likely to be intelligible. Techniques for obtaining such a carrier sense signal are utilized, for example, in the Model T440 and T441 integrated circuits sold by Aironet of Aironet Wireless Communications, Inc., Fairlawn, Ohio.

In operation, the preferred embodiment of the present invention utilizes the RSSI signal to switch the receiver 16 between a sleep mode and an active mode based on when the RSSI signal is below the threshold level set by the MAC 30. The threshold level is generally set to approximately 10 dbm above the noise floor for the environment in which the mobile terminal is located. Further, as the noise floor changes, the transceiver 10 updates the threshold level. By maintaining the threshold level at 10 dbm above the noise floor it is likely that digital receiver circuitry will not be activated by noise signals and thereby waste power.

Figure 4:
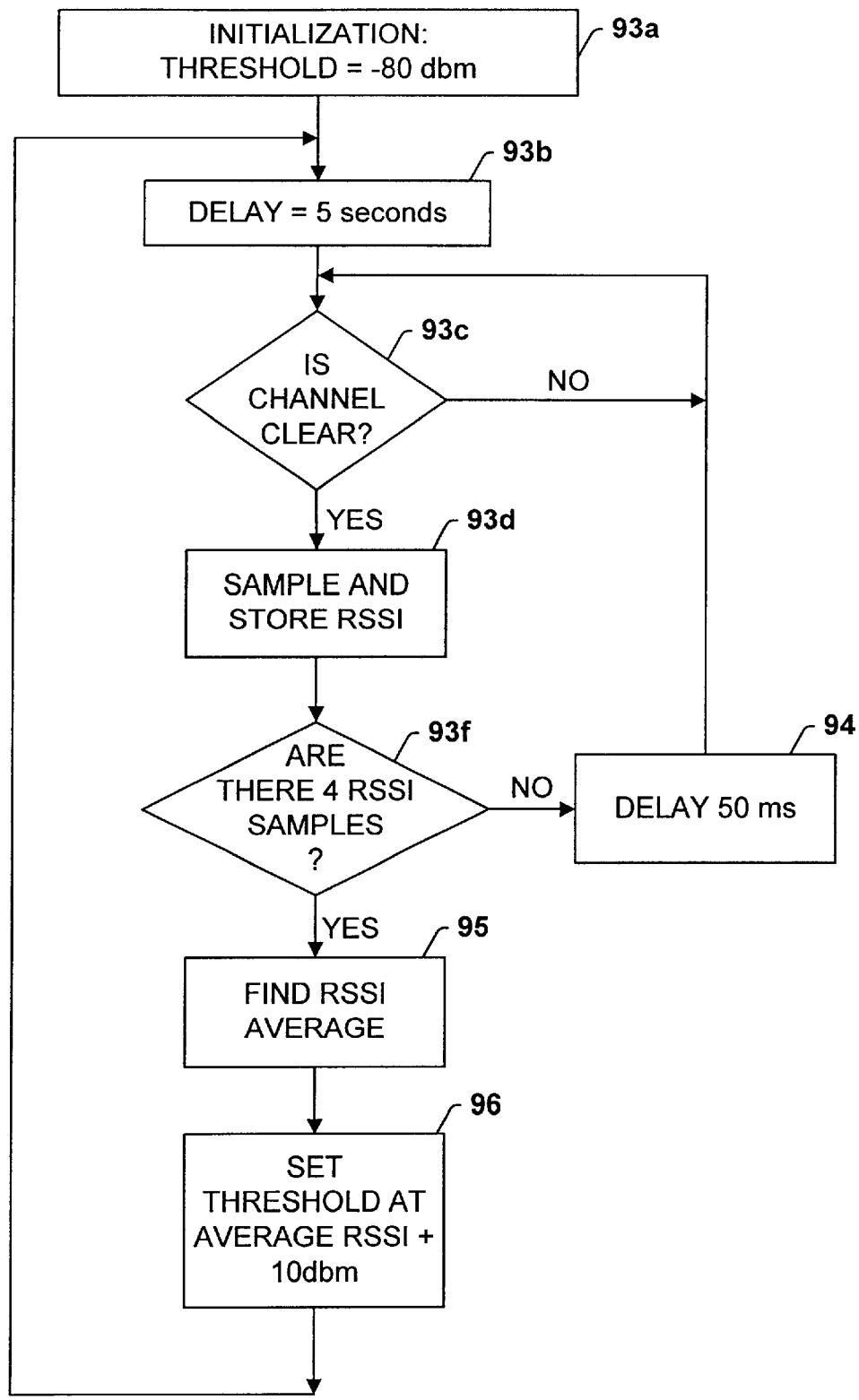
FIG. 4 is a flowchart indicating how a transceiver control circuit sets a RSSI threshold level in accordance with the present invention.

Referring now to FIG. 4, a flow chart indicating how a microprocessor 74 or other computing device included within the MAC 30 may be programmed to determine the RSSI threshold level is shown. In the preferred embodiment, the RSSI threshold level changes in relation to the noise floor in a specific frequency channel in order to best optimize system performance. More particularly, if the noise floor drops system performance may be increased by proportionally lowering the threshold level. This is because it may be possible to correlate signals received at the lower power densities thereby effectively increasing the communication range of the system. Alternatively, if the noise floor increases the RSSI threshold is increased such that the possibility of the noise level becoming sufficient to cause the receiver 16 to switch from a sleep mode to an active mode based on the noise is reduced or eliminated.

The microprocessor 74 in step 93a initializes itself upon the transceiver 10 being powered up or reset, for example. In step 93a, the microprocessor 74 sets the threshold level in the threshold register 80 at a default level of −80 dbm. Typically, signals received at or below this power density level will be noise signals and therefore it is not desirable to provide power to the digital receiver circuitry (e.g., the decimator 84 and the decoding logic 85) since power will be consumed unnecessarily. However, it may be the case that in some environments the noise level is higher than −80 dbm. Therefore, the microprocessor 74 periodically updates the RSSI threshold level approximately every five seconds in the preferred embodiment as will be explained, although other intervals are certainly possible. Following step 93a, the microprocessor 74 pauses for five seconds as shown in step 93b. The microprocessor 74 then proceeds to step 93c in which the microprocessor 74 checks whether the frequency channel the receiver 16 is operating within is clear of transmissions. Such determination may be based on the clear channel assessment signal which is conventionally available within the MAC 30. As is known, MAC controllers typically generate a clear channel assessment signal indicative of whether the frequency channel in which signals are being received is free from any incoming signals. If no incoming signals are being received, the clear channel assessment signal indicates that the channel is clear. Hence, it is known that the RSSI signal at such time is representative of the strength of the noise level as opposed to an incoming information packet. If the clear channel assessment signal does not indicate that the channel is clear, this indicates that some type of communication is occurring in the transceiver 10 and therefore the noise level cannot currently be sampled.

Thus, in step 93c the microprocessor 74 checks the clear channel assessment signal. If the channel is not clear as determined in step 93c, the microprocessor 74 continues to loop through step 93c to check the status of the frequency channel. Upon the frequency channel becoming free as determined in step 93c, the microprocessor 74 proceeds to step 93d in which it samples and stores the RSSI signal on line 39 (in dbm) in order to determine the current noise floor. However, in order to reduce the probability of error, the microprocessor 74 is programmed to sample the frequency channel a multiple number of times (e.g., four times) within a predefined period of time prior to re-setting the threshold level. Thus, from step 93d the microprocessor 74 proceeds to step 93f in which the microprocessor 74 checks to see if four samples have been taken since the last time the RSSI threshold in register 80 was updated. If not, the microprocessor 74 proceeds to step 94 in which the microprocessor 74 waits 50 milliseconds between samples and then returns to step 93c. Otherwise, if four samples have been taken since the last update the microprocessor 74 continues to step 95. Hence, after the microprocessor 74 obtains four samples of the RSSI signal when the frequency channel is clear the microprocessor 74 in step 95 computes the average of the four RSSI samples obtained via step 93d. In this manner, the MAC 30 estimates the current noise floor. Following step 95, the microprocessor 74 in step 96 sets or otherwise updates the RSSI threshold in register 80 to the average RSSI value calculated in step 95 plus 10 dbm. In particular, the microprocessor 74 takes the average value calculated in dbm in step 95, adds 10 dbm, and writes the result to the threshold register 80 (FIG. 1) via line 34. The reason for setting the RSSI threshold at approximately 10 dbm above the calculated noise floor is so that received noise is not inadvertently misinterpreted as an incoming signal thereby unnecessarily powering up the digital receiver circuitry and wasting power. Of course, some value other than 10 dbm could be utilized depending on the circumstances. Following the setting of the RSSI threshold level, the microprocessor 74 returns to step 93b where it delays five seconds before again reevaluating and updating the RSSI threshold to represent the current noise floor level. The procedure represented in FIG. 4 continues more or less throughout the operation of the transceiver 16.

Referring back briefly to FIG. 3, after the RSSI signal on line 39 is digitized and compared with the current RSSI threshold level in the digital comparator 77, the output of the comparator 77 is provided to the timing control circuit 82 as mentioned above. In the exemplary embodiment the timing control circuit 82 consists of a state machine in order to provide fast processing of information. The operation of the timing control circuit 82 will now be described in detail with reference to FIG. 5.

Figure 5:
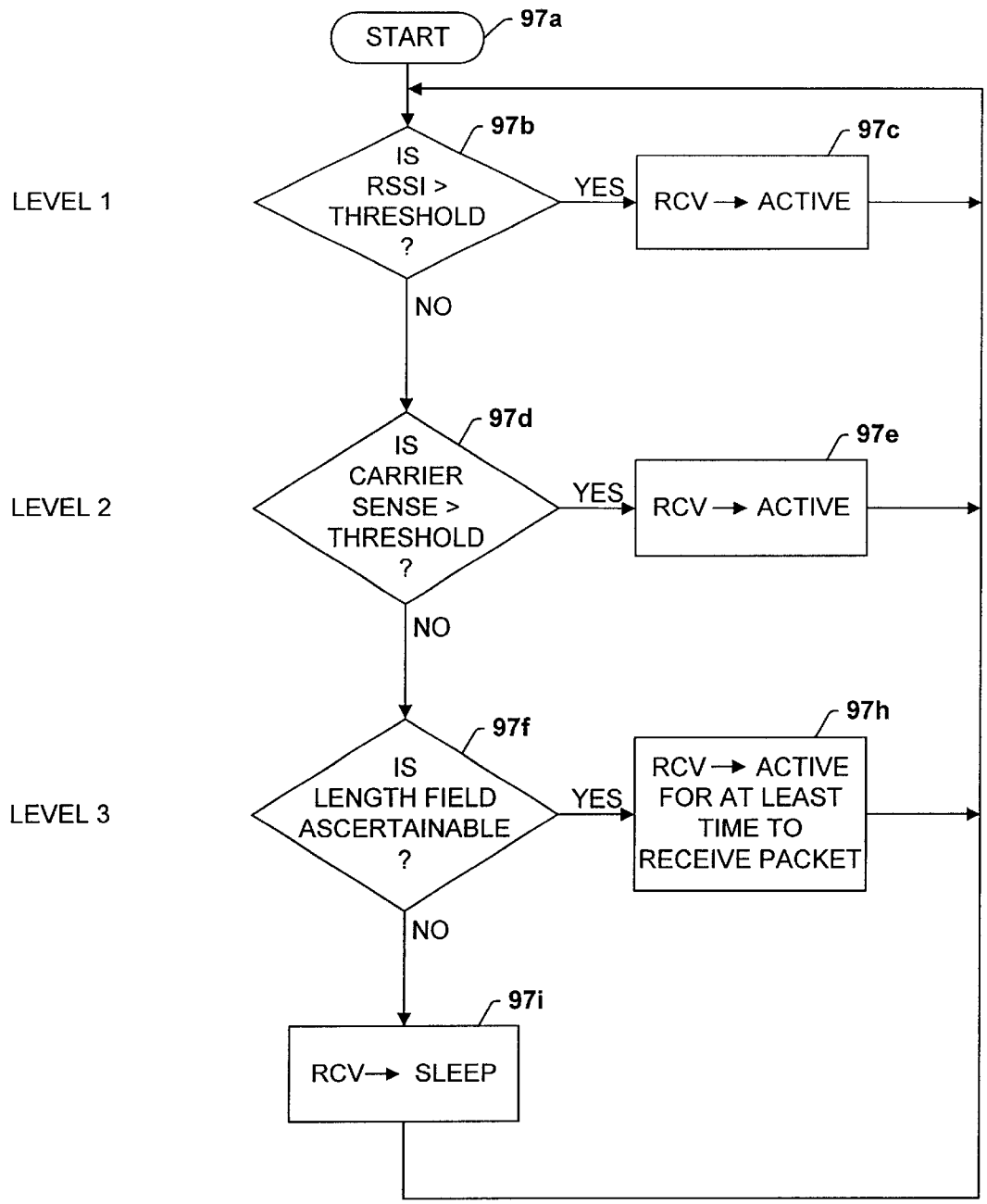
FIG. 5 is a flowchart representing how a transceiver control circuit evaluates the RSSI signal, carrier sense signal and/or length field of an incoming signal and, based on such evaluation, switches the receiver between a sleep mode and an active mode in accordance with the present invention.

As represented in FIG. 5, at step 97a, the timing control circuit 82 initializes itself upon the transceiver 10 being powered up, for example. Next, in step 97b the timing control circuit 82 determines whether the RSSI signal on line 39 is greater than the RSSI threshold value computed by the MAC 30. Specifically, the timing control circuit 82 checks the output of the digital comparator 77 on line 81 to determine if the RSSI signal exceeds the current RSSI threshold value. If yes, the timing control circuit 82 outputs on line 83 a control signal at the active mode level which serves to immediately power up the decimator 84 and decoding logic 85 as represented in step 97c. For example, the control signal on line 83 may control a switch in the decimator 84 and the decoding logic 85 which connects the main supply voltage(s) to the respective components. Consequently, as soon as an incoming signal is received causing the RSSI signal to exceed the RSSI threshold value, the receiver 16 is fully powered up to receive the incoming signal.

Following step 97c, the timing control circuit 82 returns to step 97b where it again checks whether the RSSI signal is greater than the threshold value. If yes, the control signal on line 83 continues to keep the receiver 16 in an active mode as represented in step 97c. Hence, as long as the RSSI signal remains above the threshold value, indicating the presence of a signal, the timing control circuit 82 loops through steps 97b and 97c and the receiver 16 remains in an active mode.

In the event the receiver 16 has been switched to an active mode in step 97c and an information packet is in the process of being received, it is possible in the case of weak signals that the RSSI signal may drop below the RSSI threshold level temporarily due to sporadic noise, interference, or the like. Rather than immediately switching the receiver 16 to a sleep mode, the preferred embodiment of the invention first looks to various other criteria to determine if perhaps it is still possible to receive and comprehend the packet. Thus, assuming the receiver 16 has been switched to an active mode but the RSSI signal drops below the threshold value, in step 97b the timing control circuit 82 proceeds to step 97d. In step 97d, the timing control circuit 82 looks to the output of the carrier sense comparator 90 as provided on line 91 to determine if the carrier sense signal meets the threshold criteria as determined therein. If such comparison indicates that the packet is still intelligible, the timing control circuit 82 proceeds to step 97e in which the receiver 16 is maintained in the active mode by the output on line 83. The system then returns to step 97b.

If the carrier sense signal does not meet the threshold criteria in step 97d, the timing control circuit 82 proceeds to step 97f. In step 97f, the timing control circuit 82 looks to the length field information which is provided on line 89. In the event the MAC 30 is able to obtain the length field data from the incoming packet as provide by the receiver 16 via line 97g, such information is provided by the MAC 30 on line 89. Otherwise, the information on line 89 as provided by the MAC 30 indicates that length field information is not available. If the length field information is available on line 89, the timing control circuit 82 proceeds to step 97h wherein the output provided on line 83 causes the receiver 16 to remain in an active mode for a time corresponding to the remaining length of the packet being received in terms of time. Such time duration can be computed easily by the timing control circuit 82 based on the known length of the field, the known bit rate of the incoming signal, the time at which the length of field information was initially obtained, etc. Hence, the receiver 16 will remain in an active mode at least long enough to receive the entire incoming packet. Thereafter, the timing control circuit 82 returns to step 97b. By maintaining the receiver 16 in an active mode for at least long enough to receive the entire incoming packet before proceeding back to step 97b, it is ensured that the receiver 16 is not accidentally placed into a sleep state prior to receiving the entire packet.

Hence, it will be appreciated from the flow chart in FIG. 5 that after the receiver 16 has been switched to an active mode, the timing control circuit 82 will perform three levels (Levels 1–3) of analysis before concluding that an incoming signal no longer exists and switching the receiver 16 to the sleep mode. Although the RSSI signal will typically be the best indicator of the presence of a packet to be received, the carrier sense and length field are also useful indicators. Of course, in each case the CRC field in each packet serves as an indication of the true integrity of the received packet as is conventional.

In the event there is no incoming signal or an incoming signal has been recently completed, the timing control circuit 82 will proceed directly from step 97b, to step 97d, to step 97f, and then to step 97i. In the absence of an incoming signal, the RSSI signal will be below the threshold (step 97b), the carrier sense signal will not meet the threshold criteria (step 97d), and the length filed will not be ascertainable (step 97f). Consequently, in 97i the receiver 16 will be placed in the sleep mode to the extent it has not already been.

It will be appreciated that various different protocol for detecting the presence and/or absence of an incoming signal can also be utilized in other embodiments. For example, instead of analyzing the carrier sense signal or length field immediately after the RSSI signal drops below the threshold level in step 97b, one could first evaluate whether the RSSI signal remains below the threshold level for a predetermined period of time. Such period of time could be selected to account for spurious noise glitches which may temporarily affect the RSSI level. Other options will be apparent.

Accordingly, the transceiver 10 is capable of maintaining the receiver 16 in a sleep mode until such time as a signal is received. The receiver 16 is then switched to an active mode relatively instantaneously in order to receive and process the signal. In this manner, the transceiver 10 is able to maintain a high data exchange rate while still conserving power.

Figure 6A:
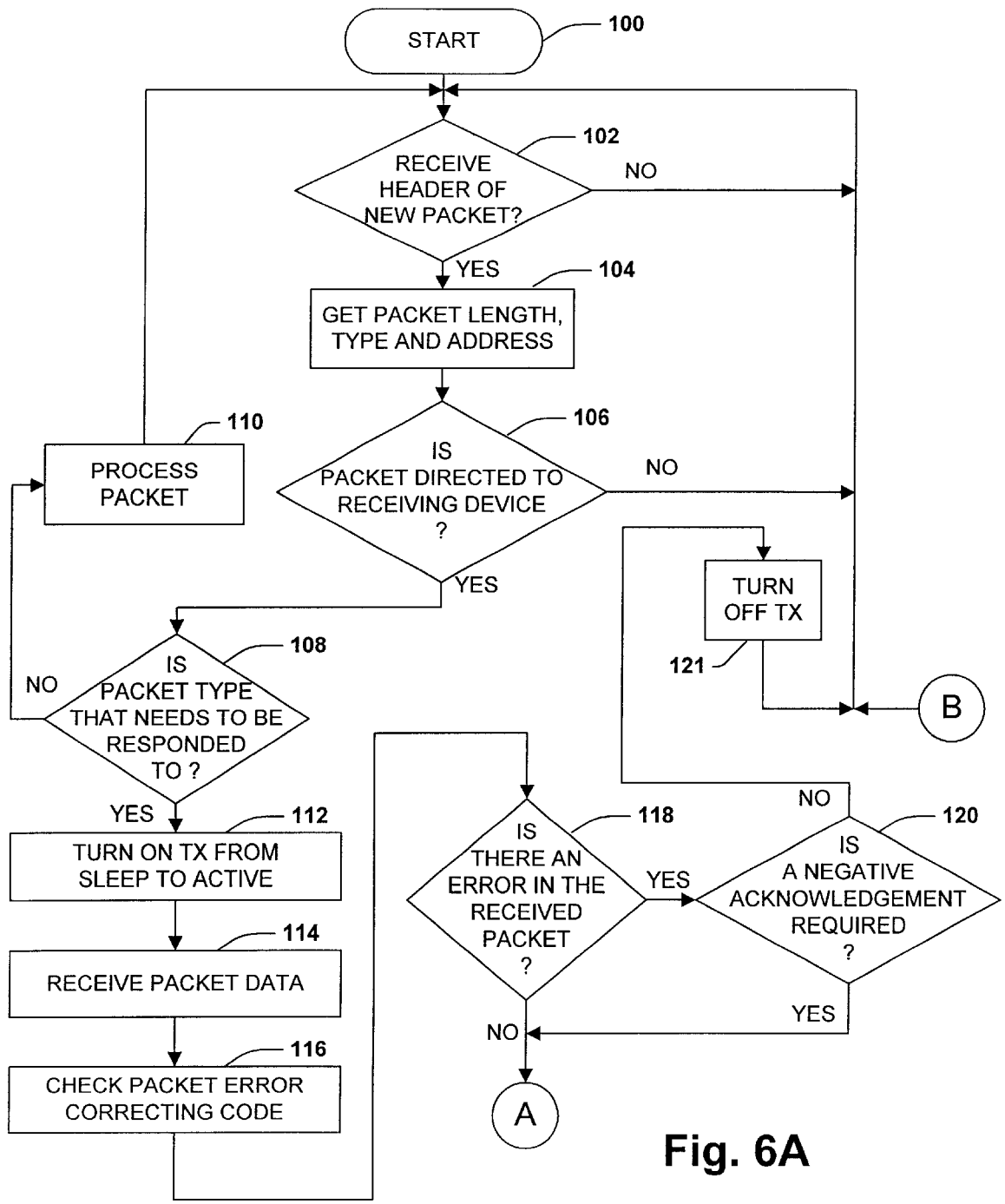
FIGS. 6A and 6B form a flowchart representing the operation of a transceiver control circuit for switching the transmitter between a sleep mode and an active mode in accordance with the present invention.
Figure 6B:
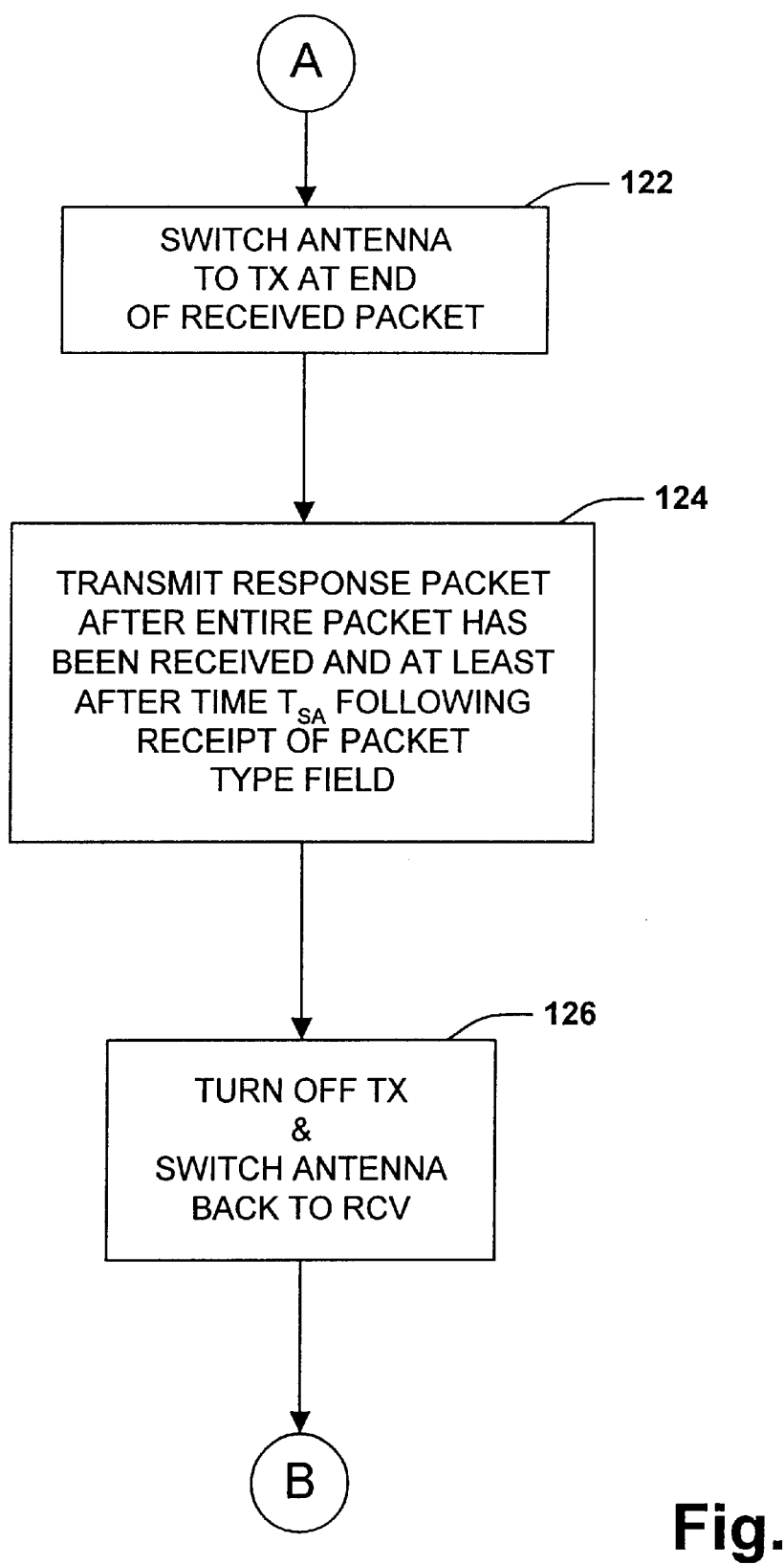

Referring now to FIGS. 6A and 6B, operation of the transceiver 10 with respect to reducing power consumption of the transmitter 12 will now be described. In the exemplary embodiment, the MAC 30 is generally responsible for switching the transmitter 12 between a sleep mode and an active mode. FIGS. 6A and 6B represent a flowchart showing the sequence of operation of the MAC 30 in relation to the transceiver 10. Beginning in block 100, the MAC 30 together with the remainder of the transceiver 10 is initialized upon being powered up via an ON/OFF switch, for example. As noted above, during such time as the transmitter 12 is not transmitting information, the transmitter 12 as controlled by the MAC 30 is normally in a sleep mode and the antenna switch 20 is in the receive position. The receiver 16 receives any incoming packets, and as a given packet 45 is being received, the receiver 16 provides the packet 45 in sequence to the MAC 30. In block 102, the MAC 30 determines whether header information belonging to a new packet as found in header field 47 (FIG. 2) has been received via the receiver 16. If no, the MAC 30 remains in a loop around block 102 until such header information is received. When the MAC 30 does receive header information in block 102 so as to indicate a new packet is being received, the MAC 30 proceeds to block 104. As the receiver 16 continues to receive the incoming packet and provide it to the MAC 30, in block 104 the MAC 30 processes the length and type/address fields 48 and 49, respectively (FIG. 2). Specifically, the MAC 30 determines the length of the packet following the header field 47 based on the information in the length field 48, and determines the destination address and packet type based on the information in the type/address field 49.

Following block 104, the MAC 30 proceeds to block 106 in which the MAC 30 determines, based on the destination address, if the packet is directed to the particular transceiver 10 in which the MAC 30 resides. For example, if the destination address in field 49 is that of the particular transceiver 10, it is determined in block 106 that the packet is in fact directed to the particular transceiver 10. Alternatively, the destination address may indicate that the received packet has been broadcasted and is thus directed to and intended to be received by the particular transceiver 10. If the packet is determined to be directed to the transceiver 10, the MAC 30 proceeds to block 108. Otherwise, the packet is dismissed as being directed to another device and the MAC 30 returns to block 102 as shown in FIG. 6A.

The MAC 30 in block 108 evaluates the type information from the type/address field 49 to determine if the packet being received is of the type which requires a response. For example, the MAC 30 determines if the type/address field 49 includes indicia indicating that a receipt acknowledgment is necessary or that the transceiver 10 will be required for some other reason to transmit some type of response to the packet. If in block 108 the MAC 30 determines that the packet is not of the type which needs to be responded to, the MAC 30 proceeds directly to block 110 wherein it carries out any other processing which may be required with respect to a packet that does not necessitate a response. Thereafter, the MAC 30 returns to block 102 where It waits for another header indicating receipt of a new packet.

In the event the MAC 30 determines in block 108 that the packet being received is of the type that requires a response, however, the MAC 30 proceeds to block 112. At such time as the MAC 30 reaches block 112, the MAC 30 provides a control signal on line 38 (FIG. 1) to switch the transmitter 12 from the sleep mode to an active mode. Hence, even before the MAC 30 has processed the data field 50 and CRC field 51 (FIG. 2), the MAC 30 provides a control signal in block 112 to power up the circuitry in the transmitter 12. In this manner, extra time can be gained to allow the transmitter circuitry to stabilize prior to transmission of a response. As discussed above in the background section, typical MAC protocols only allow a total of 15 $\mu$s for the transceiver 10 to begin responding after receiving the entire packet 45. However, given that the information needed to determine whether the incoming packet needs to be responded to can be determined by the MAC 30 prior to processing of the complete packet 45, in the preferred embodiment the MAC 30 utilizes the information as soon as it is extrapolated from the packet to begin powering up the transmitter 12 to an active mode.

Following block 112, the MAC 30 receives the packet data from data field 50 (FIG. 2) via the receiver 16 for conventional processing as represented in block 114. The MAC 30 then proceeds to block 116 in which the MAC 30 checks the error correcting code in the CRC field 51 of the incoming packet. Based on the error correcting code and using conventional techniques, the MAC 30 determines in block 118 whether an error has occurred in the receipt of the packet. If an error has occurred, the MAC 30 proceeds to block 120 in which it is determined whether a negative acknowledgment of receipt is required. Specifically, the MAC 30 refers to the information from the type/address field 49 as obtained in block 104 to determine if the received packet is of the type that requires a response indicating that the received packet included an error. If it is not necessary for the transceiver 10 to acknowledge that the packet as received included errors, the MAC 30 provides a control signal on line 38 to switch the transmitter 12 back to the sleep mode, as represented in block 121, since there is no need to respond to the erroneous packet. Thereafter, the MAC 30 returns to block 102 to await the next packet header.

If a negative acknowledgment is required in block 120, or if the MAC 30 determines in block 118 that the packet was received error free, the MAC 30 proceeds to block 122. The MAC 30 in block 122 provides a control signal on line 36 (FIG. 1) in order to change the antenna switch 20 to the transmit position upon receipt of the entire packet. Following block 122, the MAC 30 sends a control signal in block 124 to the transmitter 12 via line 32 instructing to transmitter 12 to begin transmitting a response. Most often, the response will be an acknowledgment that the transceiver 10 has successfully received the packet 45. However, the particular content of the response will depend on the particular application and is not intended to limit unnecessarily the scope of the invention as will be appreciated. The timing of the control signal provided by the MAC 30 on line 32 is designed such that the transmitter 12 will begin transmitting the response only when both (i) the entire incoming packet has been received; and (ii) at least a time $T_{sa}$ has elapsed following the initiation of the powering up of the transmitter 12 in block 112, where $T_{sa}$ represents the time period required for the transmitter circuitry to stabilize upon being switched from the sleep mode to the active mode. The value of $T_{sa}$ will depend on the particular design of the transmitter 12, but such value can easily be determined based on routine testing and evaluation as will be appreciated.

The MAC 30 then proceeds from block 124 to block 126. In block 126, following completion of the response transmission the MAC 30 provides a control signal on line 38 to switch the transmitter 12 back to the sleep mode. In addition, the MAC 30 provides a control signal on line 36 to change the antenna switch 20 back to the receive position. Thereafter, the MAC 30 returns to block 102 to await the header of the next packet. The above-described sequence is then repeated for each packet received by the transceiver 10.

Figure 7:
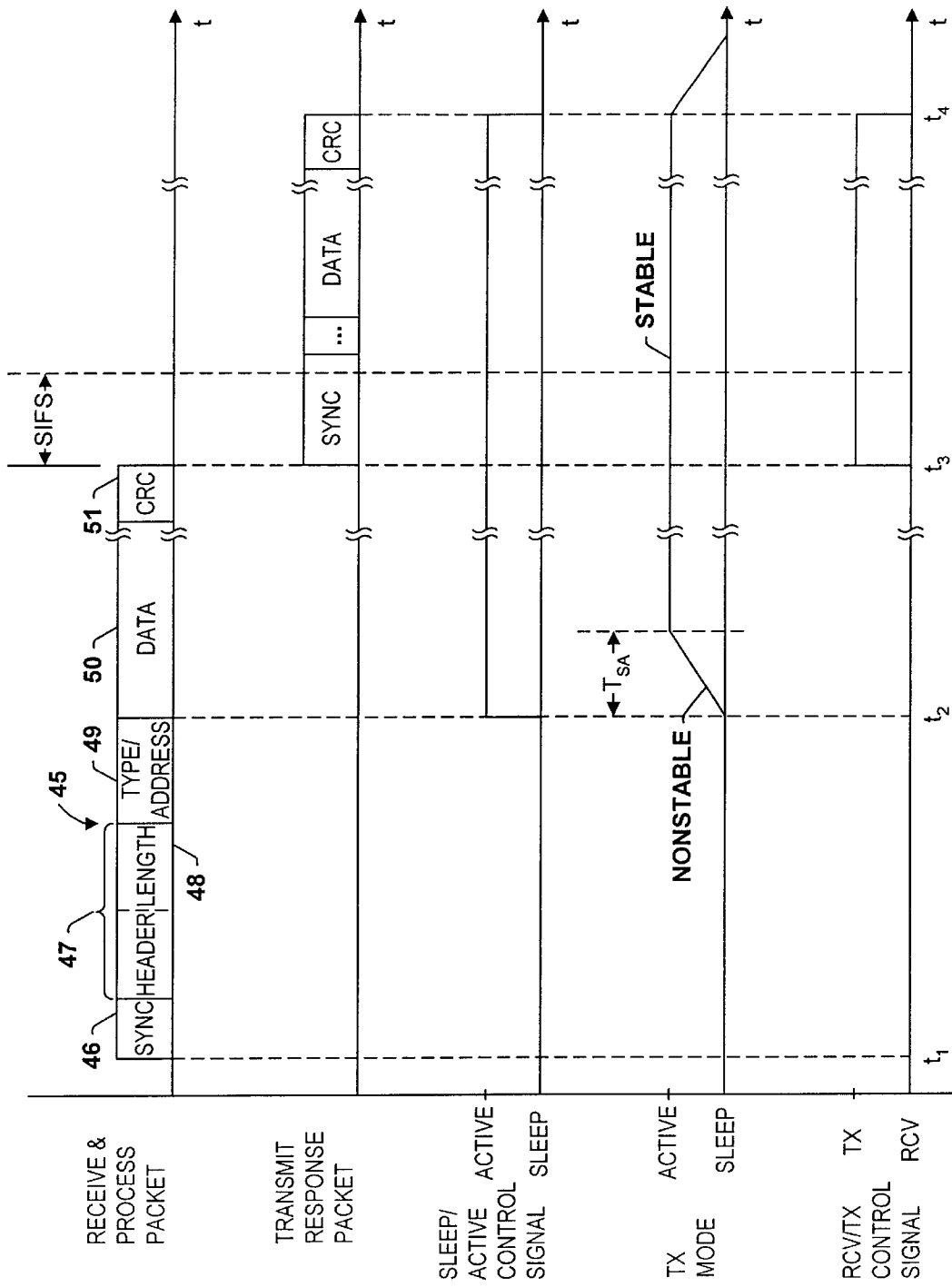
FIG. 7 is a timing diagram illustrating operation of the transceiver when switching the transmitter between a sleep mode and an active mode in accordance with the embodiment of FIGS. 6A and 6B.

FIG. 7 is a timing diagram illustrating the operation of the MAC 30 in connection with the receipt of a packet 45 and the provision of the various control signals within the transceiver 10 as set forth in FIGS. 6A and 6B. Beginning at time $t_1$, the receiver 16 begins receiving and the MAC 30 begins processing an incoming packet 45 (block 102). The MAC 30 as mentioned above includes a state machine capable of high speed processing of the incoming packet. Hence, as far as the exemplary embodiments of the invention are concerned, the timing at which the MAC 30 processes the respective fields of the incoming packet 45 is approximately identical to the timing at which the respective fields are being received by the receiver 16. Accordingly, the packet 45 as shown in FIG. 7 can be considered as representing both the time at which the packet 45 is received by the receiver 16 and the time at which the packet is processed by the MAC 30.

The SIFS slot time can be defined as a time period beginning at a time ($t_3$) when the last symbol or data value in the packet 45 being received reaches the antenna 14 (FIG. 1) from the transmitting device. The SIFS slot time ends at a time period ($t_4$) when the first symbol or data value in a response packet transmitted by the transmitter 16 exits the antenna 14 en route to the device being responded to. The actual time at which the last symbol or data value in the packet 45 being received reaches the antenna is defined as the time at which the entire packet 45 is received by the receiver 16.

At time $t_2$ in FIG. 7, the MAC 30 finishes processing the information in the type/address field 49 (blocks 104, 106 and 108). In the event the packet 45 is of the type which requires a response as is the case in FIG. 7, the MAC 30 substantially immediately provides the sleep/active control signal on line 38 to switch the transmitter 12 from the sleep mode to the active mode (block 112). As represented by the TX Mode waveform in FIG. 7, the circuitry in the transmitter 12 begins to transition from the sleep mode to a stable active mode beginning at time $t_2$. Thereafter, during such time as the remainder of the packet 45 (e.g., the data and CRC fields 50 and 51) is being received and processed by the MAC 30, the transmitter 12 continues to power up from a non-stable state towards a stable state. At time $t_3$ the entire packet 45 has been received and the MAC 30 then provides the RCV/TX control signal on line 36 (FIG. 1) to change the antenna switch 20 from the receiving position to the transmitting position (block 122).

It is also at time $t_3$ that the SIFS slot time begins for initiating a response to the packet 45. If communicating under typical MAC protocols, the SIFS time is equal to 15 μs, for example. However, as shown in FIG. 7 the transmitter 12 has been powering up from the sleep mode all during such time as the data field 50 was being received and processed. The transmitter circuitry therefore becomes stabilized much earlier than conventional systems and preferably even before. This enables the transmitter 12 to begin transmitting a response (block 124) much earlier and reliably. Thus, even if the time period $T_{sa}$ required by the transmitter 12 to stabilize from the sleep mode is approximately equal to the SIFS time slot, there is still all or at least a substantial amount of time within the SIFS slot time to initiate the response. The particular value of $T_{sa}$ will depend on the particular transmitter design, of course. In the preferred embodiment, the timing of the control signal provided on line 38 to power up the transmitter 12 is such that the transmitter circuitry will be stabilized before entering the SIFS window. The type/address field 49 may be located within the initial half of the packet 45 and preferably closer to the front of the packet so as to maximize the available time for the MAC 30 to detect whether the packet requires a response and begin powering up the transmitter 12.

At time $t_4$ the transmitter 12 completes transmission of the response and notifies the MAC 30 of such completion via line 32 (FIG. 1). The MAC 30 in turn switches the transmitter 12 back to the sleep mode via the sleep/active control signal on line 38 and switches the antenna 14 back to the receiving position (block 126). Thereafter, the transmitter 12 returns to the sleep mode as represented by the TX mode waveform in FIG. 7.

Thus, the transceiver 10 of the present invention utilizes a portion of the time spent receiving and processing a packet 45 to power up the transmitter 12 in the event the packet requires a response. This means that the transmitter will stabilize from a sleep mode substantially sooner than in the conventional case where the entire packet is received before powering up the transmitter (i.e., starting at time $t_3$). Accordingly, the present invention can operate at higher data exchange rates while still managing to conserve battery power. If no response is required, the transmitter 12 is not needlessly woken from the sleep mode.

For maximum battery power savings, the embodiment described above with respect to FIGS. 6A and 6B assumes that the packets 45 received by the transceiver 10 are relatively short in length. More specifically, it is assumed that the length of the packet 45 (with respect to time) following the type/address field 49 is shorter than time period $T_{sa}$ as shown in FIG. 7. If not, the transmitter 12 may remain idle in the fully powered active state for a longer time than necessary waiting for processing of the incoming packet to be completed. Although the transceiver 10 will be fully operational in such case, this can result in an additional power drain on the battery 26. As a practical matter, however, the additional power drain is relatively minimal compared to the overall power savings and circuit simplicity. Thus, the embodiment of FIGS. 6A and 6B is quite suitable.

In order to further conserve power while still being capable of receiving packets at any time, the present invention also provides active/sleep signals to both digital and analog components of the receiver 16.

Figure 8A:
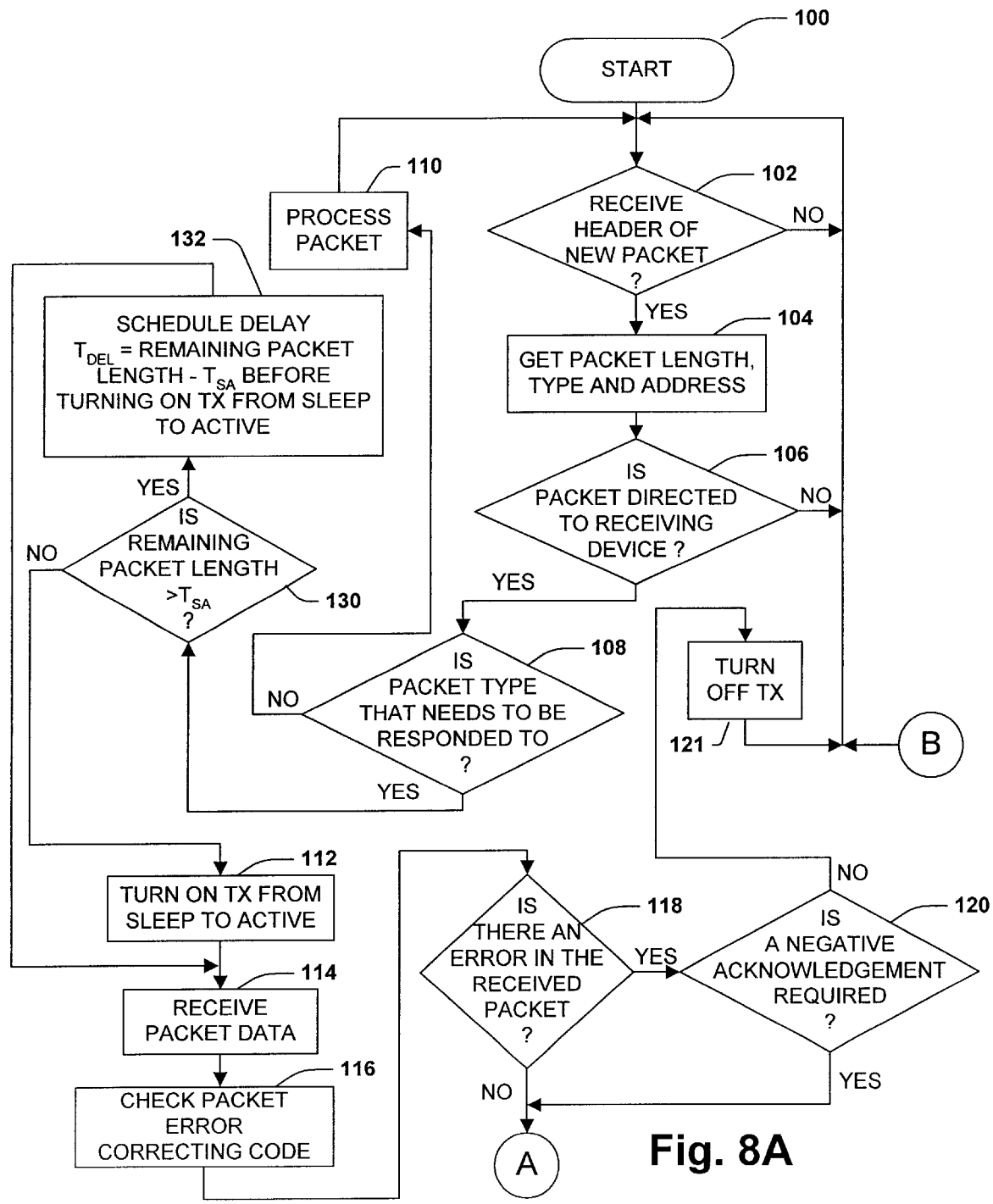
FIGS. 8A and 8B form a flowchart representing the operation of a transceiver control circuit for switching the transmitter between a sleep mode and an active mode in accordance with another embodiment of the present invention.
Figure 8B:
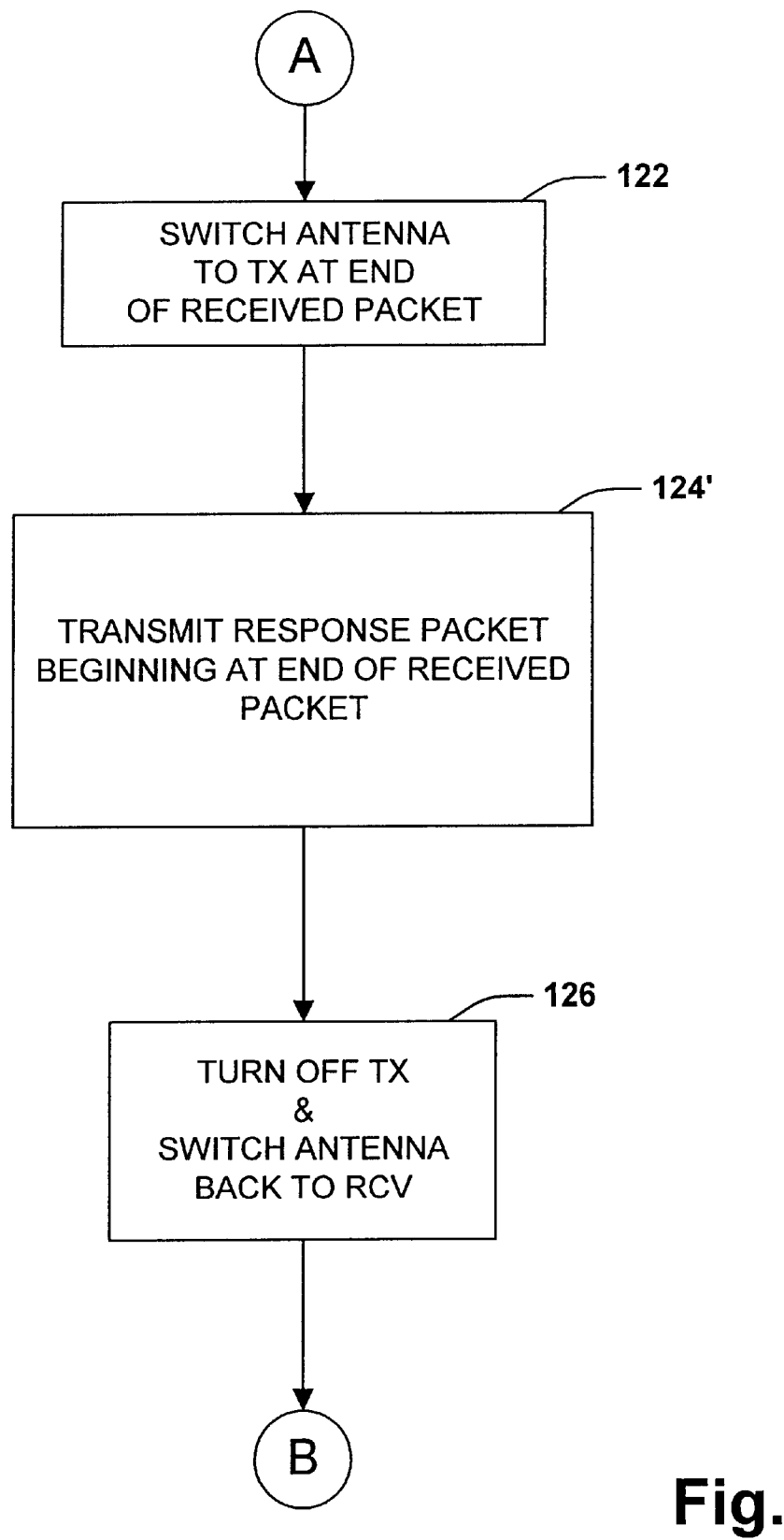

FIGS. 8A and 8B represent another embodiment of the invention which takes into account the length of each packet 45 as it is received. FIGS. 8A and 8B show a flowchart representing the sequence of operation of the MAC 30 according to such embodiment. The majority of sequence blocks are identical to those discussed above in connection with FIGS. 7A and 7B. Hence, only the differences will be discussed herein to avoid redundancy. In particular, in FIG. 8A, the MAC 30 proceeds from block 108 to block 130 in the event it is determined that the packet is of the type requiring a response. In block 130, the MAC 30 determines if the length of the remainder of the packet 45 following the type/address field 49 is greater with respect to time than the time period $T_{sa}$. The MAC 30 can be designed to make such determination based on a knowledge of the packet length as obtained in block 106, the number of bits included within the type/address field 49, the data rate, and the known time period $T_{sa}$.

Specifically, the length field 48 in the preferred embodiment includes information relating to the number of bits in the packet 45 following the length field. Such information is obtained by the MAC 30 in block 104 as discussed above. The MAC 30, having processed the type/address field 49, is designed to count the number of bits in the type/address field 49. Then, by subtracting the number of bits in the type/address field 49 from the packet length obtained in block 104, the number of bits remaining in the remainder of the packet (e.g., the data field 50 and CRC field 51) is determined by the MAC 30. Then, by dividing the number of data bits remaining in the packet by the known data rate (in bits per second) of the packet, the remaining length of the packet ($T_{remainder}$) in terms of time can be calculated. The MAC 30 can then compare the remaining length to the time period $T_{sa}$ as represented in block 130.

Figure 9:
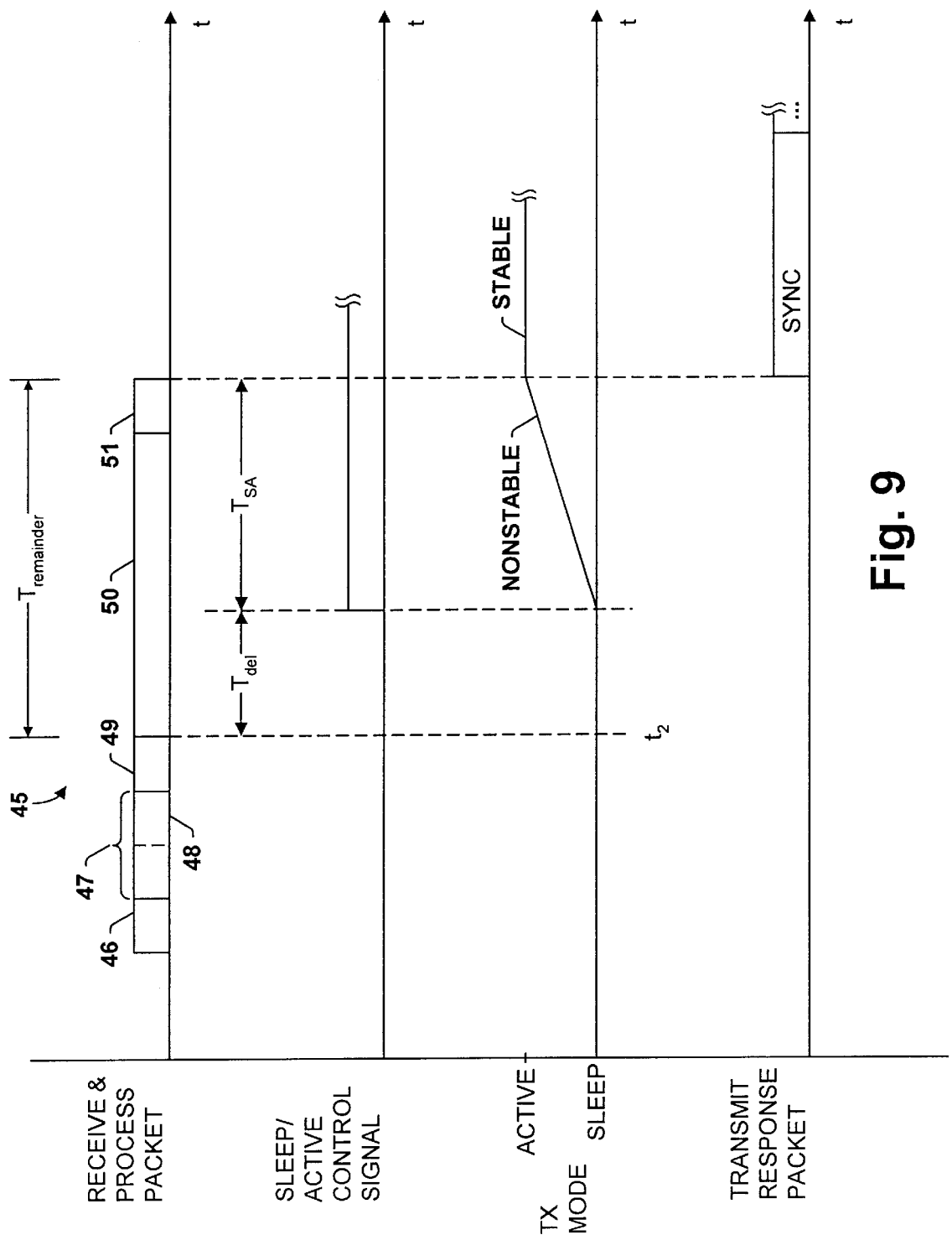
FIG. 9 is a partial timing diagram illustrating operation of the transceiver in accordance with the embodiment of FIGS. 8A and 8B.

If the length of the remainder of the packet is not greater than $T_{sa}$, the MAC 30 proceeds to block 112 whereby the MAC 30 provides a control signal on line 38 to the transmitter 12 substantially immediately following receipt of the type/address field 49 in order to switch the transmitter from the sleep mode to the active mode. On the other hand, if the length of the remainder of the packet is greater than $T_{sa}$, the MAC 30 proceeds to block 132. In block 132, the MAC 30 schedules a delay $T_{del}$ for providing the control signal on line 38 to initiate switching the transmitter from the sleep mode to the active mode. $T_{del}$ in such case is equal to the length of the remainder of the packet in terms of time minus the time period $T_{sa}$. Thereafter, the MAC 30 proceeds directly to block 114. Following block 122, the MAC 30 then goes to block 124' in which the MAC 30 provides a control signal to the transmitter 12 via line 32 instructing the transmitter to begin transmitting at the end of the received packet, e.g., at a time $T_{del}+T_{sa}$ following the end of the type/address field 49. Thus, as represented in FIG. 9, the MAC 30 waits during a delay $T_{del}$ before providing the control signal on line 38. This avoids the transmitter 12 remaining idle in a fully powered state for an appreciable amount of time while the remainder of the packet is received.

In each of the above described embodiments, the MAC 30 and timing control circuit 82 preferably include one or more state machines. It will be readily apparent to those having ordinary skill in the art of digital design, based on the disclosure herein, how to design such state machines or, alternatively, program a microprocessor to carry out the sequences of operation described herein. Such design can be carried out using conventional design and programming techniques without undue effort or experimentation. Hence, further detail is omitted.

Figure 10:
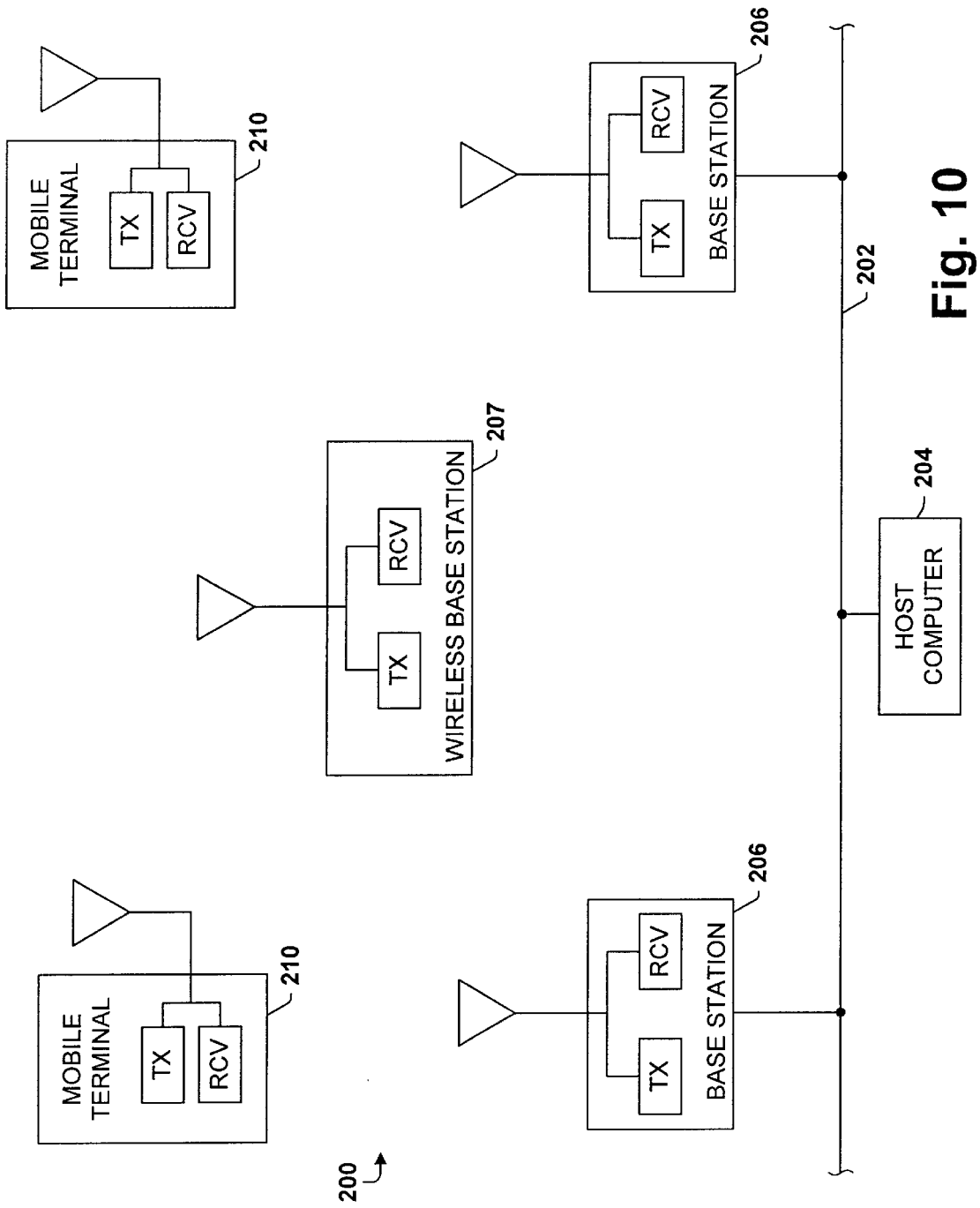
FIG. 10 is a system diagram of a cellular communication system utilizing a plurality of transceivers in accordance with the present invention.

Referring now to FIG. 10, a cellular based wireless communication system in accordance with the present invention is generally designated 200. The system 200 incorporates the above-described principles for controlling the sleep mode operation of a transceiver by way of powering up a receiver from the sleep mode upon initially receiving a packet; and beginning to power up a transmitter prior to receiving and processing an entire packet. The system 200 includes a hardwired system backbone 202 with a host computer 204 and one or more base stations 206 and wireless base stations 207. The system 200 further includes one or more battery powered mobile terminals 210 which wirelessly communicate with devices on the system backbone 202 via the base stations 206 and/or the wireless base stations 207. More specifically, data is transmitted via radio signals between the mobile terminals 210 and the base stations 206 which are hardwired to the system backbone 202. In this manner, the mobile terminals 210 are able to remain in communication with the system backbone 202 as the mobile terminals 210 roam within the system. The wireless base stations 207 can also be battery powered and serve as repeaters to extend the range of communication as is known.

As is shown in FIG. 10, each of the mobile terminals 210 and base stations 206 and 207 include a transceiver having a transmitter TX and a receiver RCV for wirelessly sending and receiving information via a corresponding antenna. In the preferred embodiment, each of the transceivers in the battery powered mobile terminals 210 and any other battery powered base stations or wireless base stations incorporate a transceiver in accordance with transceiver 10 described above. It is noted that the transceivers need not necessarily be limited to those which are battery powered, as the invention has utility with respect to a transceiver which is powered by any power supply with a limited power source. Based on the present invention, the mobile terminals 210 can transmit and receive data to/from the base stations well within the above-discussed SIFS standard and while maintaining a high data exchange rate.

In another embodiment of the present invention, the MAC 30 only takes into account the destination address of a packet 45 in determining whether to activate the transmitter 12. This embodiment may be most advantageous in systems where virtually every packet received is of a type which must be responded to by a mobile terminal. Since most packets are of the type which require a response, this embodiment eliminates extra MAC processing beyond determining whether the received packet is addressed to the mobile terminal. In operation, the MAC 30 would process information identical to that described above with reference to FIGS. 6A and 6B except that the MAC 30 would not include the type field in its analysis to determine whether the packet needs to be responded to in step 108.

In yet another embodiment of the present invention, the MAC 30 begins to power up the transmitter as soon as it begins to receive a packet regardless of the type, address or length field. This embodiment may be best suited for systems where each packet typically requires a response and where it is uncommon that a mobile terminal receives a packet which is not addressed to it. Again, the MAC 30 would operate in a manner similar to that described with reference to FIGS. 6A and 6B, with the exception of step 108. Under the present embodiment, step 108 would only be used to determine whether a first symbol or data bit of a packet is received. Upon receiving the beginning of a packet as represented by the packet's first symbol or data bit, the MAC 30 would immediately begin to power up the transmitter 12. Thus, the transmitter 12 would become stabilized prior to the receipt of the entire packet in instances where the transmitter stabilization time $T_{sa}$ is less than the packet length in terms of time. If, however, the transmitter stabilization time $T_{sa}$ is typically much shorter then the length of the remaining packet in terms of time then the MAC 30 could be configured to wait either a predetermined or random amount of time after receipt of the first symbol or data bit before turning on the transmitter 12. The predetermined or random amount of time could be determined based on known averages of a given system, for example. Alternatively, similar to the process described above with reference to FIGS. 8A and 8B, the MAC 30 could use the length field to calculate a precise time at which the transmitter 14 begins to power up.

Although the invention has been shown and described with respect to certain preferred embodiments, it is obvious that equivalents and modifications will occur to others skilled in the art upon the reading and understanding of the specification. For example, the present invention has been described with respect to a particular packet format. However, it will be appreciated that the present invention has utility with respect to virtually any format having an indicia of whether the packet requires a response. Furthermore, the MAC 30 is a state machine in the preferred embodiment due to the advantages of high speed operation. However, the control circuit 30 in general may instead be based on a microprocessor or other control device as will be appreciated. In addition, although the invention has been described primarily in the context of a radio transceiver, other types of transceivers such as optical transceivers are considered within the scope of the invention. Furthermore, although the transceiver circuitry shown is better suited for a direct sequence spread spectrum system, a frequency hopping or hybrid type transceiver could readily be used. Although many connections within the transceiver are referred to herein as lines, it will be appreciated that in some cases the lines may in fact represent multiple line (or "bus") connections.

Furthermore, in the preferred embodiment, the transmitter 12 and receiver 16 of the transceiver 10 are both capable of being placed in a sleep mode to reduce power consumption. Nevertheless, it is equally possible to have either the transmitter 12 or the receiver 16 be designed to enter a sleep mode as described herein while the other is always in an active mode. Also, it will be appreciated that the power saving features of the receiver 16 can be utilized in a stand alone receiver. Moreover, although specific circuitry in the receiver 16 is shown as capable of being disabled, other circuitry could be disabled in addition or in the alternative.

The present invention includes all such equivalents and modifications, and is limited only by the scope of the following claims.

What is claimed is:

1. A transceiver apparatus, comprising:
  a transmitter portion for transmitting information;
  a receiver portion for receiving information, the receiver portion being switchable between a low power consumption mode and an active mode; and
  a control circuit coupled to the receiver portion for selectively switching the receiver portion from the low power consumption mode to the active mode in response to detecting an information signal to be received by the receiver while in the low power consumption mode, whereby the receiver portion receives the information signal in the active mode;
  wherein the receiver portion includes power-consuming components that are selectively activated in the active mode but not activated in the low power consumption mode and power-consuming components that are activated in both the low power consumption mode and the active mode;
  wherein the supply of power to the power-consuming components that are not activated in the low sower consumption mode is reduced during the low sower consumption mode and increased during the active mode; and
  wherein the supply of power is maintained to the power-consuming components that are activated in both the low power consumption mode and the active mode during the low power consumption mode and in the active mode.

2. The transceiver apparatus of claim 1, wherein the power-consuming components that are selectively activated in the low power consumption mode comprise a front end of the receiver portion having analog circuitry for initially receiving the information signal, and wherein the power-consuming components that are activated in both the low power consumption mode and the active mode comprise a back end of the receiver portion including digital circuitry for further processing the information signal.

3. The transceiver apparatus of claim 2, wherein the control circuit detects the information signal based on a power level of the information signal obtained by the analog circuitry in the front end.

4. The transceiver apparatus of claim 3, wherein the power level is represented by a received signal strength indicator (RSSI) signal produced by the analog circuitry.

5. A transceiver apparatus comprising:
  a transmitter portion for transmitting information:
  a receiver portion for receiving information, the receiver portion being switchable between a low power consumption mode and an active mode; and
  a control circuit coupled to the receiver portion for selectively switching the receiver portion from the low power consumption mode to the active mode upon detecting an information signal to be received by the receiver, whereby the receiver portion receives the information signal in the active mode:
  wherein the control circuit switches the receiver portion between the active mode and the low power consumption mode based on a power level of the information signal;
  wherein the control circuit includes a comparator for comparing the power level of the information signal to a threshold level, and the control circuit switches the receiver portion between the active mode and the low power consumption mode based on the comparison; and
  wherein the control circuit further includes a circuit for calculating the threshold level based on a noise floor level.

6. The transceiver apparatus of claim 5, wherein the threshold level is update periodically.

7. A transceiver apparatus comprising:

a transmitter portion for transmitting information; and a receiver portion for receiving information, the receiver portion being switchable between a low power consumption mode and an active mode; and a control circuit coupled to the receiver portion for selectively switching the receiver portion from the low power consumption mode to the active mode upon detecting an information signal to be received by the receiver, whereby the receiver portion receives the information signal in the active mode;

wherein the control circuit switches the receiver portion between the active mode and the low power consumption mode based on a power level of the information signal;

wherein the control circuit switches the receiver portion from the active mode to the low power consumption mode based also on a carrier sense signal obtained from the information signal.

8. A transceiver apparatus comprising:

a transmitter portion for transmitting information;

a receiver portion for receiving information, the receiver portion being switchable between a low power consumption mode and an active mode; and a control circuit coupled to the receiver portion for selectively switching the receiver portion from the low power consumption mode to the active mode upon detecting an information signal to be received by the receiver, whereby the receiver portion receives the information signal in the active mode;

wherein the control circuit switches the receiver portion between the active mode and the low power consumption mode based on a power level of the information signal; and wherein the information signal includes a packet including length information relating to the packet, and the control circuit switches the receiver portion from the active mode to the low power consumption mode based also on an indicia of the length of the packet.

9. The transceiver apparatus of claim 1, wherein the information signal is a radio frequency signal.

10. A transceiver apparatus, comprising:

a transmitter portion for transmitting information; and a receiver portion for receiving information, wherein the receiver portion includes circuitry for detecting a signal strength of a received signal, and circuitry for disabling receiver circuitry included in the receiver portion if the signal strength of the received signal is below a predetermined threshold; and wherein the signal strength of the received signal is represented by a Received Signal Strength Indicator (RSSI) signal, the RSSI signal is input into a controller and a comparator, the controller generates a dynamically changing threshold signal based on a noise level, and the comparator compares the RSSI signal with the threshold signal generated by the controller.

11. A method for controlling a transceiver apparatus having a transmitter portion for transmitting information; and a receiver portion for receiving information, the receiver portion being switchable between a low power consumption mode and an active mode, the method comprising the step of:

selectively switching the receiver portion from the low power consumption mode to the active mode in response to detecting an information signal to be received by the receiver while in the low power consumption mode, whereby the receiver portion receives the information signal in the active mode;

said receiver portion including power-consuming components that are selectively activated in the active mode but not activated in the low power consumption mode and power-consuming components that are activated in both the low sower consumption mode and the active mode;

said selectively switching step including reducing the supply of power to the power-consuming components that are not activated in the low power consumption mode during the low power consumption mode and increasing the supply of power to these components during the active mode; and said selectively switching step also including maintaining the supply of power to the power-consuming components that are activated in both the low power consumption mode and the active mode during the low power consumption mode and in the active mode.

12. A method for controlling a transceiver apparatus having a transmitter portion for transmitting information, and a receiver portion for receiving information, the receiver portion being switchable between a low power consumption mode and an active mode, the method comprising the step of:

selectively switching the receiver portion from the low power consumption mode to the active mode upon detecting an information signal to be received by the receiver, whereby the receiver portion receives the information signal in the active mode;

wherein the information signal is detected by detecting a power level of the information signal;

wherein the receiver portion is switched if the power level is greater than a predetermined threshold; and wherein the predetermined threshold is updated periodically based on a current noise level.

13. A method for controlling a transceiver apparatus having transmitter portion for transmitting information; and a receiver portion for receiving information, the receiver portion being switchable between a low power consumption mode and an active mode, the method comprising the step of:

selectively switching the receiver portion from the active mode to the low power consumption mode if a signal strength of a received signal falls below a predetermined threshold; and wherein the receiver portion is switched if the power level is less than a predetermined threshold, and the predetermined threshold is updated periodically based on a current noise level.

14. A transceiver apparatus, comprising:

a transmitter portion for transmitting information, the transmitter portion being switchable, based on a control input, between a low power consumption mode and an active mode during which information is transmitted;

a receiver portion for receiving information, the receiver portion being switchable between a low power consumption mode and an active mode; and a control circuit coupled to the receiver portion for selectively switching the receiver portion from the low power consumption mode to the active mode in response to detecting an information signal to be received by the receiver while in the low power consumption mode, whereby the receiver portion receives the information signal in the active mode;

wherein the receiver portion includes power-consuming components that are selectively activated in the active mode but not activated in the low power consumption mode and power-consuming components that are activated in both the low power consumption mode and the active mode;

wherein the supply of power to the power-consuming components that are not activated in the low power consumption mode is reduced during the low sower consumption mode and increased during the active mode; and wherein the supply of power is maintained to the power-consuming components that are activated in both the low power consumption mode and the active mode during the low power consumption mode and in the active mode.

15. A transceiver apparatus comprising:

a transmitter portion for transmitting information, the transmitter portion being switchable, based on a control input, between a low power consumption mode and an active mode during which information is transmitted;

a receiver portion for receiving information, the receiver portion being switchable between a low power consumption mode and an active mode; and a control circuit coupled to the receiver portion for selectively switching the receiver portion from the low power consumption mode to the active mode in response to detecting an information signal to be received by the receiver, whereby the receiver portion receives the information signal in the active mode;

wherein the control circuit includes a circuit for determining whether the information signal requires a response and for switching the transmitter portion from the low power consumption mode to the active mode in the event the information signal requires a response.

16. The transceiver apparatus of claim 15, wherein the transmitter portion is switched to the active mode prior to the receiver portion receiving the entire information signal.

17. A receiver apparatus, comprising:

a receiver portion for receiving information, the receiver portion being switchable between a low power consumption mode and an active mode; and a control circuit coupled to the receiver portion for selectively switching the receiver portion from the low power consumption mode to the active mode in response to detecting an information signal to be received by the receiver while in the low power consumption mode, whereby the receiver portion receives the information signal in the active mode;

wherein the receiver portion includes power-consuming components that are selectively activated in the active mode but not activated in the low sower consumption mode and power-consuming components that are activated in both the low power consumption mode and the active mode;

wherein the supply of power to the power-consuming components that are not activated in the low power consumption mode is reduced during the low power consumption mode and increased during the active mode; and wherein the supply of power is maintained to the power-consuming components that are activated in both the low power consumption mode and the active mode during the low power consumption mode and in the active mode.

18. A receiver apparatus, comprising:

a receiver portion for receiving information, wherein the receiver portion includes circuitry for detecting a signal strength of a received signal, and circuitry for disabling receiver circuitry included in the receiver portion if the signal strength of the received signal is below a pre-determined threshold; and wherein the pre-determined threshold is updated periodically based on a current noise level.

19. A cellular communication system, comprising:

a network;

a host computer coupled to the network;

a plurality of base stations coupled to the network and communicating with the host computer, each of the base stations including a base station transmitter for transmitting wireless communications and a base station receiver for receiving wireless communications; and a plurality of mobile terminals each for communicating with the network by way of at least one of the plurality of base stations, each of the plurality of mobile terminals having a mobile terminal receiver for receiving wireless communications from at least one of the plurality of base stations;

wherein the receiver of at least one of the mobile terminals or base stations includes:

a receiver portion for receiving information, the receiver portion being switchable between a low power consumption mode and an active mode; and a control circuit coupled to the receiver portion for selectively switching the receiver portion from the low power consumption mode to the active mode in response to detecting an information signal to be received by the receiver while in the low power consumption mode, whereby the receiver portion receives the information signal in the active mode;

wherein the receiver portion includes power-consuming components that are selectively activated in the active mode but not activated in the low power consumption mode and power-consuming components that are activated in both the low power consumption mode and the active mode;

wherein the supply of power to the power-consuming components that are not activated in the low power consumption mode is reduced during the low power consumption mode and increased during the active mode; and wherein the supply of power is maintained to the power-consuming components that are activated in both the low power consumption mode and the active mode during the low power consumption mode and in the active mode.

20. A cellular communication system comprising:

a network;

a host computer coupled to the network;

a plurality of base stations coupled to the network and communicating with the host computer, each of the base stations including a base station transmitter for transmitting wireless communications and a base station receiver for receiving wireless communications; and a plurality of mobile terminals each for communicating with the network by way of at least one of the plurality of base stations, each of the plurality of mobile terminals having a mobile terminal receiver for receiving wireless communications from at least one of the plurality of base stations;

wherein the receiver of at least one of the mobile terminals or base stations includes;

a receiver portion for receiving information, the receiver portion being switchable between a low power consumption mode and an active mode; and a control circuit coupled to the receiver portion for selectively switching the receiver portion from the low power consumption mode to the active mode by detecting an information signal to be received by the receiver, whereby the receiver portion receives the information signal in the active mode;

wherein the control circuit switches the receiver portion between the active mode and the low power consumption mode based on a power level of the information signal;

wherein the control circuit includes a circuit for comparing the power level of the information signal to a threshold level, and the control circuit switches the receiver portion between the active mode and the low power consumption mode based on the comparison; and wherein the control circuit further includes threshold level circuitry for calculating and updating the threshold level based on a current noise floor level.

21. A transceiver apparatus, comprising:

a transmitter portion which transmits information;

a receiver portion which receives information and which is switchable between a low power consumption mode and an active mode; and a control circuit coupled to the receiver portion which selectively switches the receiver portion from the low power consumption mode to the active mode in response to detecting an information signal to be received by the receiver while in the low power consumption mode so that the receiver portion receives the information signal in the active mode;

wherein the receiver portion includes power-consuming components that are selectively activated in the active mode but not activated in the low power consumption mode and power-consuming components that are activated in both the low power consumption mode and the active mode;

wherein the supply of Dower to the power-consuming components that are not activated in the low power consumption mode is reduced during the low power consumption mode and increased during the active mode; and wherein the supply of power is maintained to the power-consuming components that are activated in both the low power consumption mode and the active mode during the low power consumption mode and in the active mode.

22. A transceiver apparatus, comprising:

transmitting means for transmitting information;

receiving means for receiving information; and control means for selectively switching the receiver means from a low power consumption mode to an active mode in response to detecting, while the receiving means is in the low power consumption mode, an information signal to be received so that the receiving means receives the information signal in the active mode;

wherein the receiving means includes power-consuming components that are selectively activated in the active mode but not activated in the low power consumption mode and power-consuming components that are activated in both the low power consumption mode and the active mode;

wherein the supply of power to the power-consuming components that are not activated in the low power consumption mode is reduced during the low power consumption mode and increased during the active mode; and wherein the supply of power is maintained to the power-consuming components that are activated in both the low power consumption mode and the active mode during the low power consumption mode and in the active mode.

23. A method for controlling a transceiver apparatus having a transmitter portion for transmitting information and a receiver portion for receiving information; said method comprising the steps of:

detecting an information signal to be received by the receiver portion when the receiver power is in a low power consumption mode; and switching the receiver portion from the low power consumption mode to an active mode in response to the detecting step;

said switching step being performed so that the information signal is received by the receiver portion when it is in the active mode;

said receiving portion including power-consuming components that are selectively activated in the active mode but not activated in the low power consumption mode and power-consuming components that are activated in both the low power consumption mode and the active mode;

said switching step including reducing the supply of power to the power-consuming components that are not activated in the low power consumption mode during the low sower consumption mode and increasing the supply of power during the active mode; and said switching step also including maintaining the supply of power to the power-consuming components that are activated in both the low power consumption mode and the active mode during the low power consumption mode and in the active mode.

24. A receiver apparatus, comprising:

a receiver portion which receives information and which is switchable between a low power consumption mode and an active mode; and a control circuit coupled to the receiver portion which selectively switches the receiver portion from the low power consumption mode to the active mode, while the receiver portion is in the low power consumption mode in response to detecting an information signal to be received by the receiver so that the receiver portion receives the information signal in the active mode;

wherein the receiver portion includes power-consuming components that are selectively activated in the active mode but not activated in the low power consumption mode and power-consuming components that are activated in both the low power consumption mode and the active mode;

wherein the supply of power to the power-consuming components that are not activated in the low power consumption mode is reduced during the low power consumption mode and increased during the active mode; and wherein the supply of power is maintained to the power-consuming components that are activated in both the low power consumption mode and the active mode during the low power consumption mode and in the active mode.

25. A receiver apparatus, comprising:

receiving means for receiving information; and control means for selectively switching the receiver means from a low power consumption mode to an active mode in response to detecting an information signal to be received, while the receiving means is in the low power consumption mode so that the receiving means receives the information signal in the active mode;

wherein the receiver portion-includes power-consuming components that are selectively activated in the active mode but not activated in the low power consumption mode and power-consuming components that are activated in both the low power consumption mode and the active mode;

wherein the supply of power to the power-consuming components that are not activated in the low power consumption mode is reduced during the low power consumption mode and increased during the active mode; and wherein the supply of power is maintained to the power-consuming components that are activated in both the low power consumption mode and the active mode during the low power consumption mode and in the active mode.

26. A method for controlling a receiver apparatus comprising the steps of detecting an information signal to be received by a receiver portion when the receiver portion is in a low power consumption mode; and switching the receiver portion from the low power consumption mode to an active mode in response to the detecting step;

said switching step being performed so that the information signal is received by the receiver portion when it is in the active mode;

said receiver portion including Power-consuming components that are selectively activated in the active mode but not activated in the low power consumption mode and power-consuming components that are activated in both the low power consumption mode and the active mode;

said switching step including reducing the supply of power to the power-consuming components that are not activated in the low power consumption mode during the low power consumption mode and increasing the supply of power to these components during the active mode; and said switching step also including the step of maintaining the supply of power to the power-consuming components that are activated in both the low power consumption mode and the active mode during the low power consumption mode and in the active mode.

27. A cellular communication system, comprising:

a network;

a host computer coupled to the network;

a plurality of base stations coupled to the network and communicating with the host computer, each of the base stations including a base station transmitter for transmitting wireless communications and a base station receiver for receiving wireless communications; and a plurality of mobile terminals each for communicating with the network by way of at least one of the plurality of base stations, each of the plurality of mobile terminals having a mobile terminal receiver for receiving wireless communications from at least one of the plurality of base stations;

wherein the receiver of at least one of the mobile terminals or base stations includes:

a receiver portion which receives information and which is switchable between a low power consumption mode and an active mode; and a control circuit coupled to the receiver portion which selectively switches the receiver portion from the low power consumption mode to the active mode in response to detecting an information signal, while in the low power consumption mode to be received by the receiver so that the receiver portion receives the information signal in the active mode;

wherein the receiver portion includes power-consuming components that are selectively activated in the active mode but not activated in the low power consumption mode and power-consuming components that are activated in both the low power consumption mode and the active mode;

wherein the supply of power to the power-consuming components that are not activated in the low power consumption mode is reduced during the low power consumption mode and increased during the active mode; and wherein the supply of power is maintained to the Dower-consuming components that are activated in both the low power consumption mode and the active mode during the low power consumption mode and in the active mode.

28. A transceiver apparatus as set forth in claim 1 wherein the power-consuming components that are selectively activated during the active mode but not during the low power consumption mode are components which digitize, filter, and decode received signals when the receiver portion is in the active mode.

29. A transceiver apparatus as set forth in claim 28 wherein the power-consuming components that are activated during both the low power consumption mode and the active mode are components which downconvert and demodulate signals when the receiver portion is in the low power consumption mode and the active mode.

30. A transceiver apparatus as set forth in claim 29 wherein the power-consuming components which digitize, filter, and decode received signals is primarily an analog circuit and wherein the power-consuming components which downconvert and demodulate signals is primarily a digital circuit.

31. A transceiver apparatus as set forth in claim 1 wherein the supply of power to the power-consuming components that are activated in both the low power consumption mode and the active mode is non-intermittently supplied during the low power consumption mode.

32. A method as set forth in claim 11 including the step of non-intermittently supplying power to the power-consuming components that are activated in both the low power consumption mode and the active mode.

33. A transceiver apparatus as set forth in claim 14 wherein the supply of power to the power-consuming components that activated in both the low power consumption mode and the active mode is non-intermittently supplied during the low power consumption mode.

34. A transceiver apparatus as set forth in claim 17 wherein the supply of power to the power-consuming components that are activated in both the low power consumption mode and the active mode is non-intermittently supplied during the low power consumption mode.

35. A cellular communication system as set forth in claim 19 wherein the supply of power to the power-consuming components that are activated in both the low power consumption mode and the active mode is non-intermittently supplied during the low power consumption mode.

36. A transceiver apparatus as set forth in claim 21 wherein the supply of power to the power-consuming components that are activated in both the low power consumption mode and the active mode is non-intermittently supplied during the low power consumption mode.

37. A transceiver apparatus as set forth in claim 22 wherein the supply of power to the power-consuming components that are activated in both the low power consumption mode and the active mode is non-intermittently supplied during the low power consumption mode.

38. A method as set forth in claim 23 including the step of non-intermittently supplying power to the power-consuming components that are activated in both the low power consumption mode and the active mode during the low power consumption mode.

39. A receiver apparatus as set forth in claim 24 wherein the supply of power to the power-consuming components that are activated in both the low power consumption mode and the active mode is non-intermittently supplied during the low power consumption mode.

40. A receiver apparatus as set forth in claim 25 wherein the supply of power to the power-consuming components that are activated in both the low power consumption mode and the active mode is non-intermittently supplied during the low power consumption mode.

41. A method as set forth in claim 26 including step of non-intermittently supplying power to the power-consuming components that are activated in both the low power consumption mode and the active mode is non-intermittently supplied during the low power consumption mode.

42. A cellular communication system as set forth in claim 27 wherein the supply of power to the power-consuming components that are activated in both the low power consumption mode and the active mode is non-intermittently supplied during the low power consumption mode.

43. A transceiver apparatus, comprising:

a transmitter portion for transmitting information;

a receiver portion for receiving information, the receiver portion being switchable between a low power consumption mode and an active mode; and a control circuit coupled to the receiver portion for selectively switching the receiver portion from the low power consumption mode to the active mode in response to detecting an information signal to be received by the receiver, whereby the receiver portion receives the information signal in the active mode;

wherein when operating in the low power consumption mode the apparatus consumes power at a substantially constant lower power level which is lower that an amount of power consumed by the apparatus when operating in the active mode.

* * * * *

UNITED STATES PATENT AND TRADEMARK OFFICE
CERTIFICATE OF CORRECTION

PATENT NO.         : 6,236,674 B1
APPLICATION NO. : 08/619797
DATED                 : May 22, 2001
INVENTOR(S)       : Morelli et al.

It is certified that error appears in the above-identified patent and that said Letters Patent is hereby corrected as shown below:

Claim 1, Line 20 (Col. 22, Line 16), replace "low sower" with --low power--.

Claim 1, Line 21 (Col. 22, Line 17), replace "low sower" with --low power--.

Claim 6, Line 2 (Col. 22, Line 67), replace "is update periodically" with --is updated periodically--.

Claim 11, Line 17 (Col. 24, Line 8), replace "low sower consumption" with --low power consumption--.

Claim 14, Line 24 (Col. 25, Line 9), replace "low sower" with --low power--.

Claim 17, Line 14 (Col. 25, Line 54), replace "low sower consumption" with --low power consumption--.

Claim 20, Line 17 (Col. 27, Line 5), replace "base stations includes;" with --base stations includes:--.

Claim 21, Line 19 (Col. 27, Line 47), replace "supply of Dower" with --supply of power--.

Claim 23, Line 23 (Col. 28, Line 39), replace "the low sower" with --the low power--.

Claim 25, Line 10 (Col. 29, Line 14), replace "receiver portion-includes" with --receiver portion includes--.

Claim 26, Line 12 (Col. 29, Line 41), replace "including Power-consuming" with --including power-consuming--.

UNITED STATES PATENT AND TRADEMARK OFFICE
CERTIFICATE OF CORRECTION

PATENT NO. : 6,236,674 B1
APPLICATION NO. : 08/619797
DATED : May 22, 2001
INVENTOR(S) : Morelli et al.

It is certified that error appears in the above-identified patent and that said Letters Patent is hereby corrected as shown below:

Claim 27, Line 40 (Col. 30, Line 30), replace "Dower-consuming" with --power-consuming--.

Signed and Sealed this

Twenty-second Day of May, 2007

JON W. DUDAS
*Director of the United States Patent and Trademark Office*